US009792762B2

(12) United States Patent
Walker et al.

(10) Patent No.: US 9,792,762 B2
(45) **Date of Patent: *Oct. 17, 2017**

(54) GAMING SYSTEM AND METHOD WITH ACCUMULATING EQUITY

(71) Applicant: IGT, Las Vegas, NV (US)

(72) Inventors: Jay S. Walker, Ridgefield, CT (US); James A. Jorasch, New York, NY (US); Stephen C. Tulley, Fairfield, CT (US); David F. Zucker, Winnetka, IL (US); Andrew D. Rodgers, Los Altos, CA (US); Geoffrey M. Gelman, Brooklyn, NY (US); Daniel E. Tedesco, Shelton, CT (US)

(73) Assignee: IGT, Las Vegas, NV (US)

(*) Notice: Subject to any disclaimer, the term of this patent is extended or adjusted under 35 U.S.C. 154(b) by 483 days.

This patent is subject to a terminal disclaimer.

(21) Appl. No.: 14/257,695

(22) Filed: Apr. 21, 2014

(65) Prior Publication Data

US 2014/0228105 A1 Aug. 14, 2014

Related U.S. Application Data

(63) Continuation of application No. 14/227,830, filed on Mar. 27, 2014, now Pat. No. 9,280,869, which is a (Continued)

(51) Int. Cl.
*A63F 9/24* (2006.01)
*A63F 13/00* (2014.01)
(Continued)

(52) U.S. Cl.
CPC .......... *G07F 17/3244* (2013.01); *G07F 17/32* (2013.01); *G07F 17/3267* (2013.01); *G07F 17/3269* (2013.01)

(58) Field of Classification Search
CPC . G07F 17/3244; G07F 17/326; G07F 17/3269
See application file for complete search history.

(56) References Cited

U.S. PATENT DOCUMENTS 4,669,731 A 6/1987 Clarke
4,718,672 A 1/1988 Okada
(Continued)

FOREIGN PATENT DOCUMENTS

EP 1 298 612 4/2003
GB 2372218 8/2002
(Continued)

OTHER PUBLICATIONS

Brochure: "Power Play Slots", (http: //www.softsite com/ulti/), Jan. 1997.

(Continued)

*Primary Examiner* — Milap Shah
*Assistant Examiner* — Jason Pinheiro
(74) *Attorney, Agent, or Firm* — Neal, Gerber & Eisenberg LLP

(57) ABSTRACT

Method and apparatus are described for conducting a secondary game at a gaming device. In various embodiments, a player may acquire equity in the secondary game in such forms as a location of a game character, a number of symbols aggregated, a degree of completion of a puzzle, or a defensive provision. Certain symbols or outcomes in a primary game, however, may cause the player to lose equity in the secondary game.

29 Claims, 12 Drawing Sheets

Related U.S. Application Data continuation of application No. 12/686,086, filed on Jan. 12, 2010, now Pat. No. 8,684,817, which is a continuation of application No. 10/787,356, filed on Feb. 26, 2004, now Pat. No. 7,815,503, and a continuation-in-part of application No. 10/420,981, filed on Apr. 22, 2003, now Pat. No. 8,070,577.

(60) Provisional application No. 60/450,466, filed on Feb. 26, 2003, provisional application No. 60/374,625, filed on Apr. 22, 2002.

(51) Int. Cl.

| | |
|---|---|
| ***G06F 17/00*** | (2006.01) |
| ***G06F 19/00*** | (2011.01) |
| ***G07F 17/32*** | (2006.01) |

(56) References Cited

U.S. PATENT DOCUMENTS

| | | | |
|---|---|---|---|
| 4,991,848 | A | 2/1991 | Greenwood et al. |
| 5,092,598 | A | 3/1992 | Kamille |
| 5,123,649 | A | 6/1992 | Tiberio |
| 5,178,390 | A | 1/1993 | Okada |
| 5,287,269 | A | 2/1994 | Dorrough et al. |
| 5,401,023 | A | 3/1995 | Wood |
| 5,470,079 | A | 11/1995 | LeStrange et al. |
| 5,511,781 | A | 4/1996 | Wood et al. |
| 5,570,885 | A | 11/1996 | Ornstein |
| 5,613,912 | A | 3/1997 | Slater |
| 5,687,968 | A | 11/1997 | Tarantino |
| 5,766,075 | A | 6/1998 | Cook et al. |
| 5,768,382 | A | 6/1998 | Schneier et al. |
| 5,772,509 | A | 6/1998 | Weiss |
| 5,830,067 | A | 11/1998 | Graves et al. |
| 5,833,538 | A | 11/1998 | Weiss |
| 5,935,002 | A | 8/1999 | Falciglia |
| 5,947,820 | A | 9/1999 | Morro et al. |
| 5,970,143 | A | 10/1999 | Schneier et al. |
| 5,980,384 | A | 11/1999 | Barrie |
| 5,997,400 | A | 12/1999 | Seelig et al. |
| 5,997,401 | A | 12/1999 | Crawford |
| 6,012,983 | A | 1/2000 | Walker et al. |
| 6,033,307 | A | 3/2000 | Vancura |
| 6,077,163 | A | 6/2000 | Walker et al. |
| 6,106,393 | A | 8/2000 | Sunaga et al. |
| 6,193,606 | B1 | 2/2001 | Walker et al. |
| 6,203,430 | B1 | 3/2001 | Walker et al. |
| 6,302,793 | B1 | 10/2001 | Fertitta, III et al. |
| 6,309,300 | B1 | 10/2001 | Glavich |
| 6,315,662 | B1 | 11/2001 | Jorasch et al. |
| 6,319,125 | B1 | 11/2001 | Acres |
| 6,319,127 | B1 | 11/2001 | Walker et al. |
| 6,331,144 | B1 | 12/2001 | Walker et al. |
| 6,368,216 | B1 | 4/2002 | Hedrick et al. |
| 6,379,247 | B1 | 4/2002 | Walker et al. |
| 6,386,975 | B1 | 5/2002 | Peterson |
| 6,406,369 | B1 | 6/2002 | Baerlocher et al. |
| 6,409,172 | B1 | 6/2002 | Vancura |
| 6,425,824 | B1 | 7/2002 | Baerlocher et al. |
| RE37,885 | E | 10/2002 | Acres et al. |
| 6,471,208 | B2 | 10/2002 | Yoseloff et al. |
| 6,494,785 | B1 | 12/2002 | Gerrard et al. |
| 6,500,066 | B1 | 12/2002 | Bower et al. |
| 6,506,118 | B1 | 1/2003 | Baerlocher et al. |
| 6,517,432 | B1 | 2/2003 | Jaffe |
| 6,527,638 | B1 | 3/2003 | Walker et al. |
| 6,602,136 | B1 | 8/2003 | Baerlocher et al. |
| 6,632,140 | B2 | 10/2003 | Berman et al. |
| 6,638,167 | B1 | 10/2003 | Sawyer et al. |
| 6,702,673 | B2 | 3/2004 | Webb |
| 6,709,331 | B2 | 3/2004 | Berman |
| 6,733,389 | B2 | 5/2004 | Webb et al. |
| 6,767,283 | B1 | 7/2004 | Weiss |
| 6,802,778 | B1 | 10/2004 | Lemay et al. |
| 6,887,154 | B1 | 5/2005 | Luciano, Jr. et al. |
| 6,935,955 | B1 | 8/2005 | Kaminkow |
| 6,939,224 | B2 | 9/2005 | Palmer et al. |
| 6,942,566 | B2 | 9/2005 | Baerlocher et al. |
| 6,960,135 | B2 | 11/2005 | Gaidarev et al. |
| 6,966,834 | B1 | 11/2005 | Johnson |
| 6,969,320 | B2 | 11/2005 | Lind et al. |
| 6,984,175 | B2 | 1/2006 | Nguyen et al. |
| 7,086,943 | B2 | 8/2006 | Mugnolo |
| 7,175,527 | B2 | 2/2007 | Bryant |
| 7,201,657 | B2 | 4/2007 | Baerlocher et al. |
| 7,559,838 | B2 | 7/2009 | Walker et al. |
| 2001/0031654 | A1 | 10/2001 | Walker et al. |
| 2002/0016200 | A1 | 2/2002 | Baerlocher et al. |
| 2002/0045482 | A1* | 4/2002 | Poole .................. G07F 17/3211 463/31 |
| 2002/0132660 | A1 | 9/2002 | Taylor |
| 2002/0142822 | A1 | 10/2002 | Baerlocher et al. |
| 2002/0161645 | A1 | 10/2002 | Walker et al. |
| 2002/0187824 | A1 | 12/2002 | Vancura |
| 2002/0198044 | A1 | 12/2002 | Walker et al. |
| 2003/0027629 | A1 | 2/2003 | Pimienta |
| 2003/0032474 | A1 | 2/2003 | Kaminkow |
| 2003/0036418 | A1* | 2/2003 | Seelig ..................... G07F 17/32 463/16 |
| 2003/0036430 | A1 | 2/2003 | Cannon |
| 2003/0054873 | A1 | 3/2003 | Peterson |
| 2003/0083943 | A1 | 5/2003 | Adams et al. |
| 2003/0092483 | A1 | 5/2003 | Bennett et al. |
| 2003/0109302 | A1 | 6/2003 | Rist |
| 2003/0162585 | A1 | 8/2003 | Bigelow et al. |
| 2004/0038725 | A1 | 2/2004 | Kaminkow |
| 2004/0106444 | A1 | 6/2004 | Cuddy et al. |

FOREIGN PATENT DOCUMENTS

| | | |
|---|---|---|
| WO | WO 0218023 | 3/2002 |
| WO | WO 0222225 | 2/2010 |

OTHER PUBLICATIONS

Cook, Melissa, “The Best New Slots”, Casino Player Magazine, Apr. 1998, p. 45.
Office Action for U.S. Appl. No. 10/793,141, dated Mar. 7, 2007, 19 pp.
International Search Report for Application No. PCT/US04/05795, 10 pp.
PCT International Search Report for Application No. PCT/US03/12631 in the name of Walker et al., mailed Jul. 24, 2003.
Grochowski, John, “Computers Help Players Learn Winning Strategy”, Chicago Sun Times, 1995, Section: Weekend Plus, Gaming, pp. 13, NC., 2 pp.
Pledger, Marcia, :Going for the Gold at Slot Tournaments, Las Vegas Review-Journal, Dec. 24, 1995, pp. 5 L., 4 pp.
Hawley, David, “Those one-armed bandits; Slot machine tournaments lure throngs to Midwest casinos,” The Houston Chronicle, Apr. 9, 1996, Section: Houston, pp. 3, 3 pp.
“A.C. Coin & Slot Staying Power”, Global Gaming Business, Sep. 15, 2002, p. 42.
Pending U.S. Appl. No. 08/766,576, entitled “Secure Improved Remote Gaming System”, filed Dec. 6, 1996.
Grochowski, John, “Slot tourney prospers under Indiana rules”, Chicago Sun Times, Apr. 6, 1997, Section, SHO, Casinos, pp. 15, NC., 1 pp.
Pending U.S. Appl. No. 09/218,258, entitled “System and Method for Automatically Initiating Game Play on an Electronic Gaming Device”, filed Dec. 22, 1998.
Poole, David, “Letter from Charlotte: Vegas perfect for racing”, Las Vegas Review-JHournal, Jun. 22, 1997, Section: C, p. 2C.
“Station Announces formation of GameCast Live, LLC and Release of Remote Play eSlots for In-room Gaming Applications”, PR Newswire, Jun. 6, 2001, Financial News Section, 2 pp.
Website: “Casino Journal World of Slots AC Coin—the Interactive Experience”, (http: //wwwcasinocenter_com/journal/oct97/html/ac_coin_html), download date, Jun. 4, 1998.

(56) References Cited

OTHER PUBLICATIONS

Website, “Extending the Casino Floor”, GameCast Live, (http: //www.gamescastlive.com/presentation/Toronto_files/slide0012.htm), download date: Jun. 6, 2001, 12 pp.
Website: “Press Your Luck (PYL) General Information Page”, (http: //members fortunecitycom/jd83/pylinfo_html), undated.
Website: “IMA Provides Launch Platform for Innovative New AWP!”, Coin-Op News, Google’s cache of http ://www preview-uk com/coin_op_storyasp?ID=286, Nov. 1, 2003.

* cited by examiner

400

| | PLAYER IDENTIFIER 420 | NAME 430 | ADDRESS 440 | FINANCIAL ACCOUNT IDENTIFIER 450 | DEMOGRAPHIC 460 | CREDITS 470 | LIFETIME COIN-IN 480 |
|---|---|---|---|---|---|---|---|
| 405 | P111123 | SAM BROWN | ANYPLACE, USA | 1111-1111-1111-1111 | MALE, AGE 23 | 55 CREDITS, $0.25 PER CREDIT | $600 |
| 410 | P222234 | LINDA JONES | SOMEPLACE, USA | 2222-2222-2222-2222 | FEMALE, AGE 47 | 0 | $14400 |

FIG. 4

500

| | GAMING DEVICE IDENTIFIER 520 | NAME 530 | MANUFACTURER 540 |
|---|---|---|---|
| 505 | G333333 | DIAMOND MINE | ABC CORP. |
| 510 | G444444 | CRAZY DEUCES | XYZ CORP. |

FIG. 5

700

710

| SPIN NUMBER 720 | OUTCOME 730 | STARTING BALANCE 740 | PAYOUT / LOSS 750 | ENDING BALANCE 760 | SPINS REMAINING 770 |
|---|---|---|---|---|---|
| S 0001 | PLUM / CHERRY / BELL | 20 | 0 | 20 | 19 |
| S 0002 | PLUM / 7 / BAR | 20 | 0 | 20 | 18 |
| S 0003 | BAR / ORANGE / BELL | 20 | 0 | 20 | 17 |
| S 0004 | CHERRY / CHERRY / BELL | 20 | 5 | 25 | 16 |
| S 0005 | PLUM / CHERRY / CHERRY | 25 | 5 | 30 | 15 |
| S 0006 | PLUM / PLUM / PLUM | 30 | 20 | 50 | 14 |
| S 0007 | PLUM / 7 / 7 | 50 | 0 | 50 | 13 |
| S 0008 | BAR / BAR / BAR | 50 | 50 | 100 | 12 |
| S 0009 | ORANGE / BELL / BAR | 100 | -50 | 50 | 11 |
| S 0010 | PLUM / PLUM / PLUM | 50 | 20 | 70 | 10 |
| S 0011 | BAR / ORANGE / PLUM | 70 | 0 | 70 | 9 |
| S 0012 | 7 / PLUM / PLUM | 70 | 0 | 70 | 8 |

FIG. 7

800

810

| SPIN NUMBER 820 | OUTCOME 830 | STARTING BALANCE 840 | PAYOUT / LOSS 850 | ENDING BALANCE 860 | SPINS REMAINING 870 |
|---|---|---|---|---|---|
| S 0013 | PLUM / PLUM / BAR | 70 | 14 | 94 | 7 |
| S 0014 | PLUM / 7 / BAR | 94 | 0 | 94 | 6 |
| S 0015 | ORANGE / BELL / BAR | 94 | -47 | 47 | 5 |
| S 0016 | CHERRY / CHERRY / BELL | 47 | 5 | 52 | 4 |
| S 0017 | PLUM / CHERRY / BELL | 52 | 0 | 52 | 3 |
| S 0018 | PLUM / PLUM / PLUM | 52 | 20 | 72 | 2 |
| S 0019 | PLUM / 7 / 7 | 72 | 0 | 72 | 1 |
| S 0020 | ORANGE / BELL / BAR | 72 | -36 | 36 | 0 |

FIG. 8

1000

| PARAMETER 1002 | SETTING 1004 |
| --- | --- |
| SPINS REMAINING | 9 |
| CHERRIES AGGREGATED | 8 |
| PAYMENT FOR AGGREGATING AT LEAST 10 CHERRIES | 40 |
| PAYMENT FOR AGGREGATING AT LEAST 20 CHERRIES | 500 |
| CHERRY LOCK BOXES POSSESSED | 1 |

FIG. 10

1100

| SYMBOL 1102 | RELATED PARAMETER 1104 | ADJUSTMENT TO PARAMETER 1106 |
|---|---|---|
| LOSE TWO SPINS | SPINS REMAINING | SUBTRACT 2 |
| CHERRY | CHERRIES AGGREGATED | ADD 1 |
| LOSE TWO CHERRIES | CHERRIES AGGREGATED | SUBTRACT 2 |
| ADVANCE 3 SPACES | GAME CHARACTER LOCATION | ADD 3 |
| GO BACK 4 SPACES | GAME CHARACTER LOCATION | SUBTRACT 4 |
| SHOVEL | SHOVELS AGGREGATED | ADD 1 |
| LOSE SHOVEL | SHOVELS AGGREGATED | SUBTRACT 1 ONLY IF > 0 |

FIG. 11

GAMING SYSTEM AND METHOD WITH ACCUMULATING EQUITY

PRIORITY CLAIM

This application is a continuation of, claims priority to and the benefit of U.S. patent application Ser. No. 14/227,830, filed on Mar. 27, 2014, which is a continuation of, claims priority to and the benefit of U.S. patent application Ser. No. 12/686,086, filed on Jan. 12, 2010, now U.S. Pat. No. 8,684,817, which is a continuation of, claims priority to and the benefit of U.S. patent application Ser. No. 10/787,356, filed on Feb. 26, 2004, now U.S. Pat. No. 7,815,503, which claims priority to and the benefit of U.S. Provisional Patent Application No. 60/450,466, filed on Feb. 26, 2003 and which is a continuation-in-part application of U.S. patent application Ser. No. 10/420,981, filed on Apr. 22, 2003, now U.S. Pat. No. 8,070,577, which claims priority to and the benefit of U.S. Provisional Patent Application No. 60/374,625, filed on Apr. 22, 2002, the entire contents of which are incorporated by reference herein.

BACKGROUND

Gaming devices are very popular in the U.S. and abroad. Gaming devices, such as slot machines, video poker machines, video blackjack machines, video roulette machines, video kenos, and video bingo machines, provide many casinos and other entities with the majority of their profits.

Players naturally find winning outcomes at gaming devices more appealing because winning outcomes add excitement to a gaming session. Although winning outcomes provide excitement to players, casinos often consider balancing those benefits with the costs in paying players for winning outcomes. Accordingly, casinos have often limited the average frequency of winning outcomes at a gaming device.

BRIEF DESCRIPTION OF THE DRAWINGS

FIG. 4 is a table illustrating an exemplary data structure of a player database for use in some embodiments of the present invention.

FIG. 5 is a table illustrating an exemplary data structure of a gaming device database for use in some embodiments of the present invention.

FIGS. 7 and 8 depict a table that illustrates an exemplary data structure of a session database for use in some embodiments of the present invention.

FIG. 10 is a table illustrating an exemplary data structure of a game situation database for use in some embodiments of the present invention.

FIG. 11 is a table illustrating an exemplary data structure of a database describing the effects of various symbols on parameters of a secondary game, for use in some embodiments of the present invention.

TERMS AND DEFINITIONS

Figure 1:
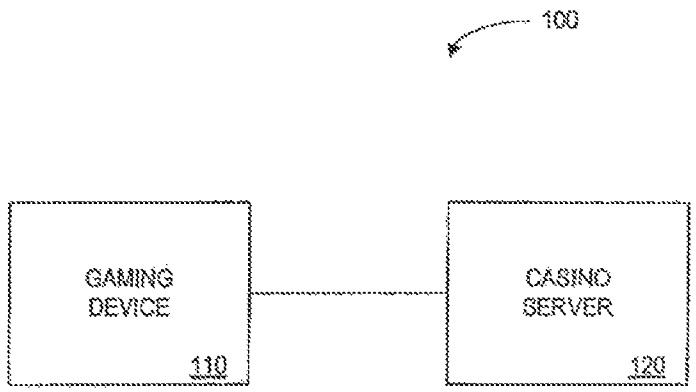
FIG. 1 is a block diagram of a system consistent with some embodiments of the present invention.

As used herein, the term "bank" is a verb meaning to lock in a benefit corresponding to a certain credit balance. For example, a player might engage in contract play, where he begins with forty credits, agrees to make five hundred handle pulls, and keeps any credits remaining after the five hundred handle pulls. After pull number two hundred fifty, the player might have a credit balance of ninety-five, and wish he could quit right there and take the ninety-five credits. Otherwise, he would risk having his credit balance go lower and ending up with fewer than ninety-five credits. If the player is allowed to bank, then he can bank the ninety-five-credit benefit he would receive were the contract to end immediately after pull two hundred fifty. The player is thereby assured of receiving at least ninety-five credits at the end of the contract. However, if the player has a credit balance of more than ninety-five credits at the conclusion of the contract (i.e., after the full five hundred pulls), then the player can receive a benefit of more than ninety-five credits.

As used herein, the term "chute" refers to a type of shortcut on an exemplary game described herein called the "Up and Down Game". The chute is a shortcut that transfers a game character from a relatively more advanced position on a game board to a relatively less advanced position on the game board.

As used herein, the term "equity" refers to any promise of value or potential value that the player has stored within the gaming device. For example, equity may include an amount of money that the player has inserted into the gaming device and which is now displayed in the form of credits. Equity may also include a balance of winnings that will be paid to the player if the player completes a predetermined number of handle pulls. Equity may include features of a gaming device or of a game played on the gaming device that contribute to a player's expected winnings. For example, equity may take the form of position of a game character on a game board. The advanced position of the game character may provide the expectation of the player achieving a favorable result in the game, and thereby of receiving winnings.

As used herein, the term "gaming device" refers to any electrical, mechanical, or electro-mechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include slot machines, video poker machines, video blackjack machines, video roulette machines, video keno machines, video bingo machines, and the like.

As used herein, the term "gross winnings" refers to the total of a player's winnings during the execution of a contract without regard to wagers made by the player. For example, if, after five pulls of a contract, a player has attained one winning outcome with a payout of four coins, and one winning outcome with a payout of twenty coins, then the player's gross winnings thus far are twenty-four coins. Since gross winnings does not account for wagers a player makes, gross winnings will always be larger than or equal to net winnings.

As used herein, the term "handle pull" refers to a complete primary game at a gaming device, involving the placement of a wager, the determination of an at least partially random or pseudo-random outcome, the determination of a payment amount, and the providing or crediting of a player with the payment amount.

As used herein, the term "ladder" refers to a type of shortcut on an exemplary game described herein called the "Up and Down Game". The ladder is a shortcut that transfers a game character from a relatively less advanced position on a game board to a relatively more advanced position on the game board.

As used herein, the term "negative outcome" refers to an outcome that deducts credits from a player's credit balance. In particular, a negative outcome may deduct more than the amount wagered on a handle pull, more than the typical amount wagered, or more than the maximum possible wager. One example of a negative outcome is an outcome that takes away ten credits from a player's credit balance. Another example is an outcome that takes away 50% of a player's credit balance.

As used herein, the term "net winnings" refers to the total of a player's winnings during the execution of a contract less the amount spent by the player on wagers. In the example cited under the definition of "gross winnings," the net winnings are nineteen coins since the player has won twenty-four coins but used one coin as a wager on each of the five pulls.

As used herein, the terms "payout" and "payment" may be used interchangeably to indicate an amount of cash, credits, or other currency or tokens of value that are provided, or are to be provided to a player at a gaming device.

As used herein, the term "secondary game" refers to a game which spans at least two handle pulls at a slot machine, whose actions are based on at least one outcome of the handle pulls, and from which a separate payout can be won (the separate payout being in addition to any payout won from the handle pulls themselves).

As used herein, the term "supplementary process" refers to a secondary or parallel means by which a player may derive benefit at a gaming device. In one example, a player receives the benefit of an extra payline at a gaming device without having to increase his wager. In another example, a player receives the benefit of an extra game character on a secondary or bonus game. In a third example, a player may obtain "egg" symbols, giving the player eggs that cook while the player plays, and which provide a benefit to the player at the conclusion of a block of handle pulls.

DETAILED DESCRIPTION

Applicants have recognized that gaming sessions can be more exciting when a player can win greater average amounts, can win more frequently and or can lose greater average amounts.

Applicants have recognized that gaming sessions can be more exciting when a gaming session includes a game that encompasses more than one handle pull.

Applicants have recognized that gaming sessions can be more exciting when a player can accumulate value other than cash or coins.

Applicants have recognized that gaming sessions can be more exciting when a player can accumulate large amounts of value, but can also lose value already accumulated.

Some embodiments of the present invention allow a player at a gaming device to participate in a secondary game in addition to a primary game. Primary games may include standard slot machine video poker, and other games that are well known to those skilled in the art. For example, a primary game played on a gaming device may include the placement of a wager by a player, the pressing of a "spin" button by the player, the generation of an outcome by the gaming device, and the payment of the player by the gaming device based on the outcome. The secondary game may last two or more handle pulls, and may depend in part on the results of primary games. For example, a secondary game may involve the accumulation of symbols that are obtained in two or more primary games. A secondary game may also involve the traversal of a game board by a game character, in which the movements of the game character are dictated by results of the primary game. The play of secondary games may create a more interesting and diverse experience for players. Rather than being resolved within seconds after a single handle pull, as many primary games are, secondary games may last for minutes or even hours, and may unfold in many different and exciting ways.

During the play of secondary games, players may accumulate value, or "equity" which may take the form of cash or credits, but which may also take other forms. For example, one form of equity may include the position of a game character on a game board in a secondary game. A character that is further advanced may be more valuable to a player, as the character may have a greater chance of reaching some target location corresponding to a payout in the secondary game. Another form of equity may include a number of symbols that have been aggregated in a secondary game. A player may receive a payout in a secondary game for aggregating a predetermined number of symbols obtained through the primary game. Accordingly, a player is more likely to receive a payout the more symbols he has already aggregated. Therefore, the number of symbols already aggregated in a secondary game may constitute value, or equity for the player. Various other forms of equity will be described further in the various embodiments below.

Some embodiments of the present invention provide for ways in which a player may lose equity in a secondary game. For example, a player's game character may be set back from a more advanced location on a game board, to a less advanced location on the game board. In another example, a player who has accumulated a number of symbols in a secondary game may have some of the symbols taken away upon the occurrence of a particular symbol or outcome in a primary game.

According to these and other embodiments, players may build up equity rapidly in a secondary game, allowing for greater player excitement. However, the potential of a player to lose equity may limit the number of large payouts that an operator of a gaming device must make. Therefore, the profitability of gaming devices of the present invention may be maintained, while also allowing for greater excitement.

Referring now to FIG. 1, an apparatus 100 according to embodiments of the present invention includes a casino server 120 that is in communication with one or more gaming devices 110. Each of the gaming devices may comprise computers, such as those based on the Intel® Pentium® processor, that are adapted to communicate with the casino server 120; portable types of computers, such as a laptop computer; a palm-top computer; a hand-held computer; or a Personal Digital Assistant (PDA). Other equivalent devices capable of performing the methods specified herein would be apparent to one of skill in the art.

Any number of gaming devices may be in communication with the casino server 120. The number of each depicted in FIG. 1 is solely for purposes of illustration.

The casino server 120 may communicate with the gaming devices directly or via a network, including without limitation the Internet, a wireless network protocol, a local area network (or any combination thereof), through a Web site maintained by casino server 120 on a remote server or over an on-line data network including commercial on-line service providers, and bulletin board systems. The casino server may communicate with the gaming devices, the player devices and the insurer devices directly or indirectly. In yet other embodiments, the devices may communicate with casino server 120 over radio frequency (RF), cable TV, satellite links and the like.

Those skilled in the art will readily understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The casino server 120 may function as a "Web server" that generates Web pages (documents on the Web that typically include an HTML file and associated graphics and script files) that may be accessed via the Web and allows communication with the casino server 120 in a manner known in the art.

In various embodiments, the casino server may perform any functions described herein as being performed by a gaming device, and vice versa.

FIG. 1 depicts only an embodiment of the invention. Other arrangements of devices to perform various methods specified herein will be readily appreciated by those of skill in the art.

Figure 2:
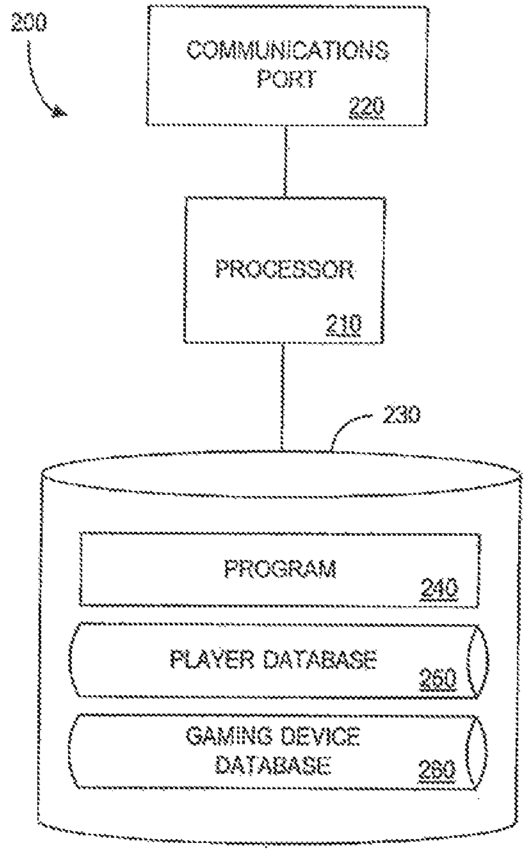
FIG. 2 is a block diagram of some embodiments of a casino server.

FIG. 2 illustrates an embodiment 200 of the casino server 120 (FIG. 1). The casino server 120 may be implemented as a system controller, a dedicated hardware circuit, an appropriately programmed general-purpose computer, or any other appropriate device including without limitation electronic, mechanical or electro-mechanical devices.

The server of the illustrated embodiment comprises a processor 210, such as one or more Intel® Pentium® microprocessors. The processor 210 is in communication with a communications port 220 and a data storage device 230. The communications port 220 allows the processor 210 to communicate with other devices, such as a gaming device. The data storage device 230 comprises magnetic memory, optical memory, semiconductor memory or any combination thereof. The data storage device 230 may include, for example, Random Access Memory (RAM), Read-Only Memory (ROM), a compact disc, digital video disc and/or a hard disk. The processor 210 and the storage device 230 may each be, for example: (i) located entirely within a single computer or computing device; or (ii) connected to each other by a remote communication medium, including without limitation a serial port cable, a telephone line, a network connection or a radio frequency transceiver. In some embodiments, the casino server 120 may comprise one or more computers that are connected to a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format, as well as in a variety of other forms known in the art. The program 240 furthermore includes program elements that may be necessary, including without limitation an operating system, a database management system and "device drivers" for allowing the processor 210 to interlace with peripheral devices. Appropriate program elements are well known to those skilled in the art, and need not be described in detail herein.

According to an embodiment of the present invention, the instructions of the program 240 may be read into a main memory from another computer-readable medium, such as into RAM from hard drive or ROM. Execution of sequences of the instructions in program 240 causes processor 210 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 230 also stores a player database 250 and a gaming device database 260. The databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Based on the present disclosure many other arrangements of data will be readily understood by those of skill in the art.

Figure 3:
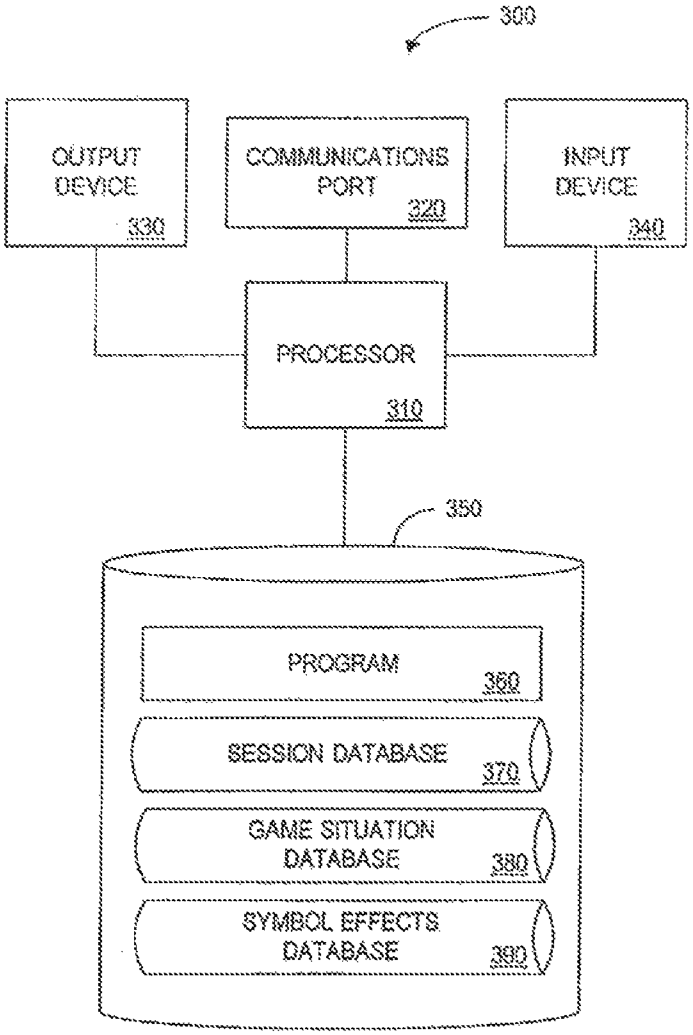
FIG. 3 is a block diagram of some embodiments of a gaming device.

FIG. 3 illustrates an embodiment 300 of a gaming device. Well-known examples of gaming devices include video poker, video blackjack, pachinko, mechanical slot machines and video slot machines. The gaming device may be implemented as a dedicated hardware circuit, an appropriately programmed general-purpose computer, or any other appropriate device including without limitation electronic, mechanical or electro-mechanical devices. Accordingly, the gaming device need not include the various components depicted in FIG. 3.

The gaming device of the illustrated embodiment comprises a processor 310, such as one or more Intel® Pentium® microprocessors. The processor 310 is in communication with a communications port 320 and a data storage device 350. The data storage device 350 comprises magnetic memory, optical memory, semiconductor memory or any combination thereof. The data storage device 350 may include, for example, Random Access Memory (RAM), Read-Only Memory (ROM), a compact disc and/or a hard disk. The processor 310 and the storage device 350 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 350 stores a program 360 for controlling the processor 310. The processor 310 performs instructions of the program 360, and thereby operates in accordance with the present invention, and particularly in accordance with the methods described in detail herein. The program 360 may be stored in a compressed, uncompiled and/or encrypted format, as well as in a variety of other forms known in the art. The program 360 furthermore includes program elements that may be necessary, including without limitation an operating system, a database management system and "device drivers" for allowing the processor 310 to interface with peripheral devices. Appropriate program elements are well known to those skilled in the art, and need not be described in detail herein.

According to an embodiment of the present invention, the instructions of the program 360 may be read into a main memory from another computer-readable medium, such as into RAM from hard drive or ROM. Execution of sequences of the instructions in program 360 causes processor 310 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The processor 310 may also be in communication with one or more input devices 340 and one or more output devices 330.

Examples of input devices include: a button; a touch screen; a handle; a player tracking card device, which performs functions related to player tracking cards, such as reading player tracking cards and communicating information read from such cards to the processor 310 (Typically, information read from such cards includes unique player identifiers, such as a sequence of digits or a sequence of alphanumeric characters); a ticket reader, which is capable of reading tickets and particularly indicia registered on tickets and like material; a credit card reader which generally allow a card such as a credit card or debit card to be inserted therewithin and information to be read therefrom.

Examples of output devices include: a cash dispenser, which dispenses coins and/or bills to players that have requested to have funds be dispensed; a ticket printer, which may be commanded to print onto a substrate, such as paper or other material; a display screen, such as a liquid crystal display, a plasma display and a video display monitor.

Player Database

FIG. 4 is a tabular representation 400 of the player database. The tabular representation 400 of the player database includes a number of example records or entries 405 and 410 each defining a player. Those skilled in the art will understand that the player database may include any number of entries. The tabular representation 400 also defines fields for each of the entries or records. The fields specify: (i) a player identifier 420 that uniquely identifies the player; (ii) a name 430 of the player; (iii) an address 440 of the player; (iv) a financial account identifier 450 of the player, which may be, e.g., a credit card, debit card or checking account number; (v) demographic data 460 about the player, such as the age, gender, income level of the player; (vi) credits 470 which the player has accumulated in one or more previous and current plays at one or more gaming devices; and (vii) an indication of the aggregate amount 480 that the player has ever wagered, or that the player has ever deposited in a gaming device or made available for wagering at a gaming device.

Not all of the fields depicted in FIG. 4 are required, and various substitutions, deletions and other changes to the tabular representation will be readily apparent to those of ordinary skill in the art.

Gaming Device Database

FIG. 5 is a tabular representation 500 of the gaming device database. The tabular representation 500 of the gaming device database includes a number of example records or entries 505 and 510, each defining a gaming device. Those skilled in the art will understand that the gaming device database may include any number of entries. The tabular representation 500 also defines fields for each of the entries or records. The fields specify: (i) a gaming device identifier 520 that uniquely identifies the gaming device; (ii) a name 530 of the gaming device, which may additionally or alternatively specify the type of game(s) playable at the gaming device; and (iii) a manufacturer 540 of the gaming device.

Not all of the fields depicted in FIG. 5 are required, and various substitutions, deletions and other changes to the tabular representation will be readily apparent to those of ordinary skill in the art.

Figure 6:
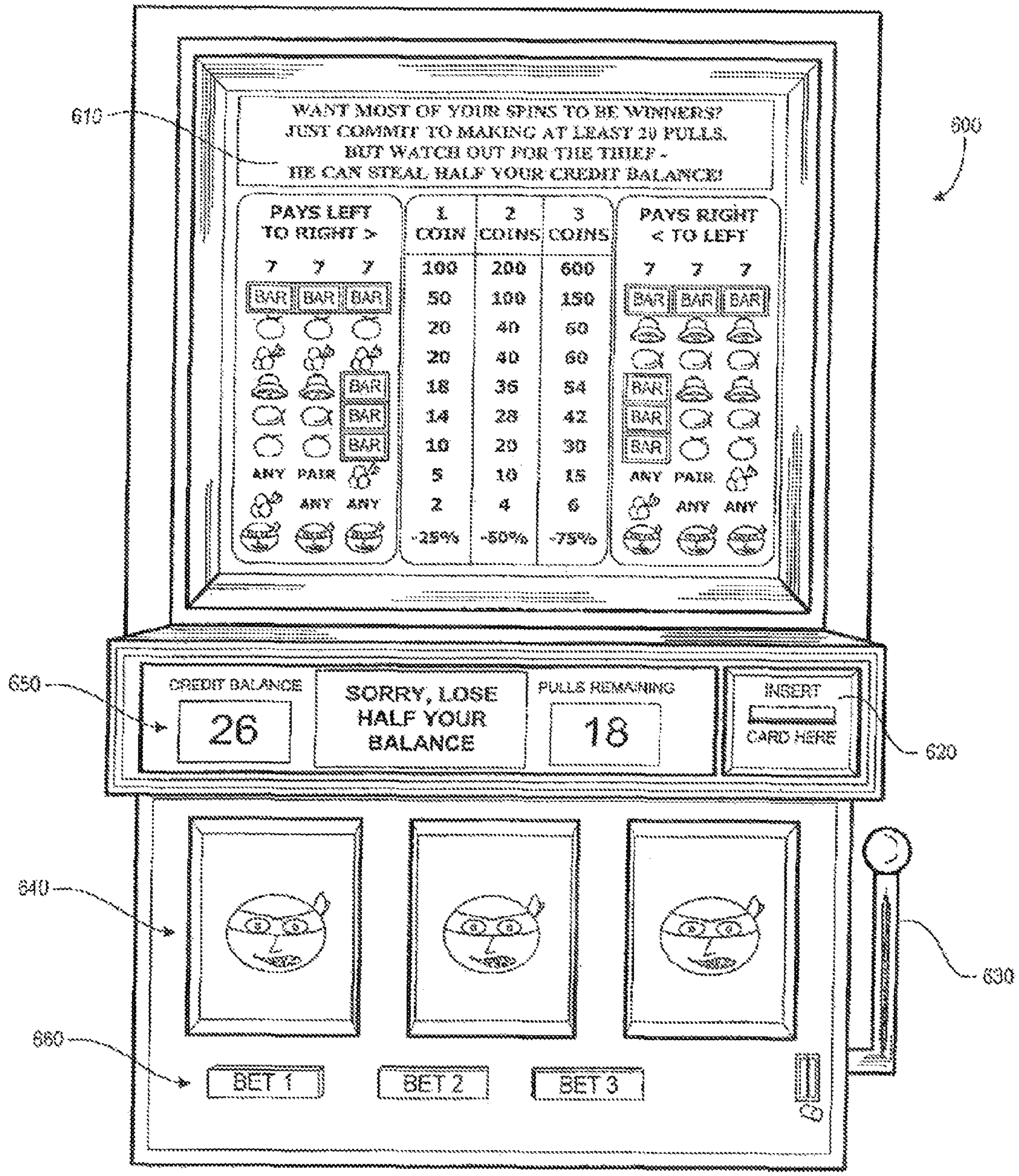
FIG. 6 is a front planar view of an illustrative gaming device, according to some embodiments.
Figure 9:
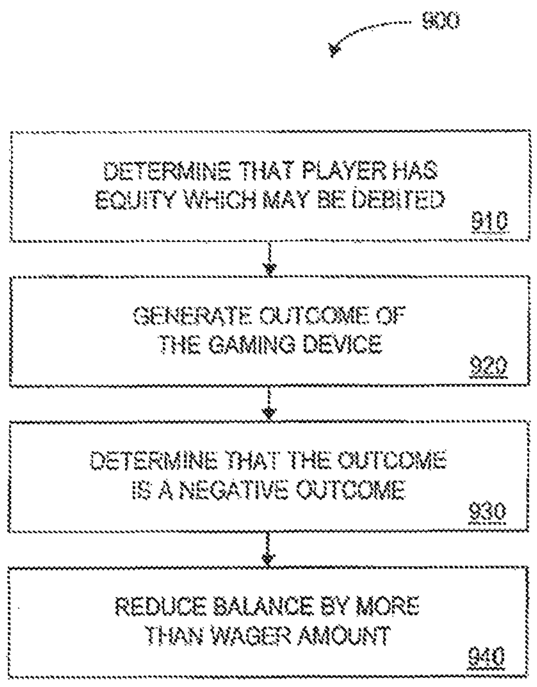
FIG. 9 is a flow chart illustrating an exemplary process according to some embodiments of the present invention.

Referring to FIG. 6, an illustrative gaming device 600 includes an information area 610, which displays a message to the user that a commitment of 20 outcomes makes most outcomes winning outcomes. Gaming device 600 also includes a card reader 620 for reading, e.g., player tracking cards. A handle 630 is used for initiating plays, in a manner known in the art. A display area 650 provides information, such as a credit balance and a number of spins (i.e. plays or outcomes) remaining (e.g., for play according to the terms of a contract as described herein).

Reels 640 display the outcome of a play in the form of a reel symbol on each reel, as is known in the art. Buttons 660 allow the player to indicate wager amounts for an outcome.

Session Database

FIGS. 7 and 8 depict tables 700 and 800 representing the session database. The tables 700 and 800 include a number of example records or entries 710, each defining an outcome of a player's gaming session. Those skilled in the art will understand that the session database may include any number of entries. The tables 700 and 800 also define fields for each of the entries or records. The fields specify: (i) a spin number (720 and 820) that uniquely identifies the outcome; (ii) an outcome (730 and 830) description, which describes the particular reel symbols; (iii) a starting balance (740 and 840) before any adjustment in the balance due to the outcome; (iv) a payout or loss (750 and 850) due to the outcome; (vi) an ending balance (760 and 860) after any adjustment in the balance due to the outcome, and which is the sum of the starting balance and the payout or loss due to the outcome; and (vii) a number of outcomes remaining (770 and 870) which must be completed per the terms of an agreement as described in further detail herein.

Not all of the fields depicted in FIGS. 7 and 8 are required, and various substitutions, deletions and other changes to the tabular representation will be readily apparent to those of ordinary skill in the art.

Method Steps for Various Embodiments

The following discussion describes method steps for various embodiments. The gaming device may initiate a secondary game at a gaming device, in which the course of the secondary game depends on outcomes of two or more handle pulls. The gaming device may initiate a secondary game upon signal from a player. For example, a player may press a designated button (e.g., a button labeled "play game") on the gaming device. The player may also place a separate wager on the secondary game. For example, in addition to any wagers made in one or more primary games, the player may place a wager on the secondary game. Any payout or payment made to the player as a result of the secondary game may then depend on his wager. In some embodiments, the player may not be required to place a separate wager to initiate the secondary game. In some embodiments, the player need not specifically indicate a desire to participate in a secondary game. Rather, the player's participation may be automatic once he begins play of a primary game.

Once a secondary game has been initiated, the gaming device may determine a first situation of the secondary game. As used herein, a situation of a secondary game may include a particular group of settings for one or more of the parameters governing play of the secondary game. For example, one parameter is the location on which a game character resides. A setting for such a parameter may be e.g., “the fifth square from the beginning,” square “b7,” the “blue square,” etc. Another parameter may be the number of handle pulls remaining in which to complete the secondary game. Such a parameter may include a setting of e.g., “10 pulls,” “39 pulls,” or “0 pulls.” Other exemplary parameters may include parameters describing the layout of a game board, the number of a particular type of symbol aggregated, the percent completion of a puzzle, and so on. Each of these parameters may have particular settings in a particular situation of a game. In various embodiments, a situation of a game is a particular group of settings in which every parameter governing the play of the secondary game has a particular setting.

FIG. 10 depicts an exemplary table 1000 representing a database for storing the situation of a secondary game. The game depicted in FIG. 10 is a game in which a player aggregates “cherry” symbols. Five exemplary parameters 1002 are depicted. Each parameter has a corresponding setting 1004. One parameter is the “spins remaining” parameter. The setting for the parameter is currently “9”, indicating that the player currently has nine spins remaining in which to complete the secondary game. Another parameter is the “cherries aggregated” parameter, having a corresponding setting of “8.” Thus, the player has currently aggregated eight cherries in the game. Another parameter is the “payout for aggregating at least ten cherries” parameter, which currently has a payout of “40.” Thus, if the player aggregates at least ten cherries by the time he completes the secondary game, the player will receive a payout of forty coins. Similarly, if the player aggregates at least twenty cherries by the end of the game, the player will receive five hundred coins, based on the setting for the “payout for aggregating at least twenty cherries” parameter. It should be noted that the setting of the “payout for aggregating at least ten cherries” parameter may change during the course of the secondary game, just as the setting of any other parameter may change. For example, the setting of the parameter may change from forty to thirty during the course of the secondary game. If the setting of the “payout for aggregating at least ten cherries” is thirty at the end of the secondary game, and the player has aggregated eleven cherries (e.g., the setting of the “cherries aggregated” parameter is “11”), then the player may receive a payout of thirty coins. Another parameter listed in table 1000 is the “cherry lock boxes possessed” parameter. According to some embodiments, for each cherry lock box possessed, a player may ensure that five cherries cannot be taken away from him. That is, each lock box may hold five cherries, which are then protected from loss. Thus, it may be beneficial to a player to obtain lock boxes, even though the number of lock boxes obtained does not directly impact a payout for the game. Like the settings of other parameters, the setting of the “cherry lock boxes possessed” parameter may change. During the course of a game, a player may obtain more lock boxes, or he may lose lock boxes already possessed.

Discussion now continues with the method steps of some embodiments of the present invention. Once the first situation of the secondary game has been determined, a second situation of the secondary game may be determined. Like the first situation, the second situation may include a group of settings for the parameters governing play of the secondary game. In the second situation, some of such settings may be different from the settings of the first situation. For example, in the first situation, the parameter describing the number of pulls remaining in the game may have the setting of “10 pulls.” In the second situation, the same parameter may have the setting of “5 pulls.” The second situation of the game may be determined in various ways. In some embodiments, a set of rules govern how a second situation is determined from a first. One exemplary rule indicates that the parameter describing the number of pulls remaining in a secondary game is decremented by one every time a handle pull is made at the gaming device. Some rules describe how a particular situation, such as the second situation, is determined based on the symbols or outcomes that occur in a primary game. For example, a symbol in a primary game may include an “advance three spaces” symbol. Accordingly, the parameter describing the location occupied by a game character may be updated to include or indicate a location that is three locations forward of the previous location indicated by the same parameter.

FIG. 11 depicts a an exemplary table 1100 representing a database storing rules for how the settings of parameters 1104 of a secondary game may change based on the occurrence of symbols 1102 in a primary game. As depicted, the occurrence of a “lose two spins” symbol in a primary game may cause the subtraction of two from the setting of the “spins remaining” parameter of the secondary game. The occurrence of a “cherry” symbol may cause the addition of one to the setting of the “cherries aggregated” parameter. The effects, or the “adjustment to [a corresponding] parameter” 1106 resulting from the occurrence of other symbols listed in FIG. 11 will be apparent from the figure. By changing the setting of a parameter governing play of a game, the occurrence of a symbol in a primary game may change the situation of a game from a first situation to a second situation. It should be appreciated that a situation of a game may also change based on an outcome (e.g., several symbols occurring along the same payline of the gaming device in a primary game), based on the setting of a parameter reaching a certain value (e.g., if the setting of a “game character location” parameter ever reaches “27” then the setting is automatically changed to “12”, representing a game character falling back on a game board), based on a time of day, based on the weather, and so on.

In some embodiments, the second situation of the game is less favor to a player than is the first situation. One example of a second situation that is less favorable than a first situation arises in a secondary game involving the aggregation of symbols. In such a game, a player may aggregate “cherry” symbols obtained in a primary game. The player may receive a payout in the secondary game if he aggregates at least ten cherry symbols. Accordingly, it is generally move advantageous for the player to have more cherry symbols aggregated. Thus, an example of a second situation that is less favorable than a first situation is a second situation in which a player has fewer cherry symbols aggregated than he had in the first situation, with the settings of all other parameters of the game remaining approximately the same.

(Alternatively, other settings may also be less favorable in the second situation than in the first—e.g., the setting of a pulls remaining parameter is lower in the second situation than in the first, giving the player less opportunity to aggregate ten cherry symbols). A player in the second situation would be further from his goal of aggregating ten cherries, and would therefore be less likely to achieve a payout or payment in the secondary game.

In various embodiments, a given situation may be associated with an expected payment. That is, a player finding himself in the given situation would receive, on average, the expected payment. Suppose, in one example, that a player has one spin remaining in a secondary game involving the aggregation of symbols. The player has nine cherries aggregated already, but needs a tenth cherry symbol in order to receive a payout of twenty coins. Further, suppose the probability of obtaining a cherry on the tenth spin, without also obtaining any symbols that takes away cherries, is 0.2. The player will therefore receive a payout of twenty coins with probability 0.2, and no payout with probability 0.8. The player's expected payment is therefore $0.2\times20+0.8\times0=4$ coins.

In various embodiments, any situation of game may be associated with an expected payment. A second situation may be said to be less favorable than a first situation if the expected payment corresponding to the second situation is less than the expected payment corresponding to the first situation. In some embodiments, however, the cost of completing a game may be included in a determination of an expected payment associated with a secondary game. For example, if an expected payment associated with a secondary game is eleven coins, but the cost of completing the secondary game (e.g., the cost of making wagers in the primary game that dictates the course of the secondary game) is five coins, then the secondary game may be associated with an expected payment minus cost of six coins. Further, the expected payment from one or more primary games may also factor into the determination of whether a second situation is more or less favorable than a first situation. For example, a given situation may be associated with a total expected payment from both the secondary game and all primary games required to complete the secondary game, less the cost of completing all the primary games. For example, suppose the expected payment from a secondary game is eleven coins. However, completion of the secondary game will cost five coins, since it will take five wagers in order to complete the five handle pulls of the primary game necessary to complete the secondary game. Suppose further, however, that the expected payment from each of the primary games (the payout percentage multiplied by the wager amount) is 0.95 coins. Thus, the expected payment from the five primary games is $5\times0.95=4.75$ coins. Thus, the secondary game may be associated with a value equal to eleven coins (the expected payment of the secondary game) minus five coins (the cost of completing the five primary games necessary to complete the secondary game) plus 4.75 coins (the expected payment from the five primary games). The value associated with the secondary game may accordingly be 10.75 coins. A second situation may be said to be less favorable than a first situation if a value (e.g., in coins) associated with the second situation is less than the value associated with the first situation. As has been illustrated, this value may be an expected payment in a secondary game or a more complicated value derived using costs of the primary game and expected payments associated with each primary game required for completion of the secondary game. As will be appreciated, there are many other metrics by which a second situation of secondary game may be said to be less favorable to a player than a first situation of a secondary game.

Various factors within a game that contribute to a higher expected payment (or a higher value associated with a game situation) may be referred to herein as "equity". That is, a player has equity in a game if the settings of various parameters are such as to give the player a positive expected payment in the game. For example, a setting of "8" for a number of "cherry" symbols aggregated may constitute player equity in a game. The player may have a positive expected payment for the game because the setting of the parameter describing the number of "cherry" symbols aggregated is so close to a target setting of "10".

Continuing with a discussion of the method steps of various embodiments, a gaming device may generate a first outcome. For example, the gaming device may receive a signal from a player, whereby the player presses a "spin" button, pulls a handle of the gaming device, or otherwise expresses a desire for the gaming device to generate an outcome. The outcome may comprise a set of one or more symbols, such as a set of symbols forming a complete pay line of the gaming device. In generating the outcome, the gaming device may first determine a random or pseudo-random number and match the number to an outcome using a predefined table. In this way, the gaming device may arrive at a random or pseudo random outcome. The gaming device may then cause the outcome to be displayed in an entertaining way, by first spinning the reels of the gaming device, and by then causing the reels to stop in such a way that the symbols of the outcome are visible to a player. Based on the outcome, the gaming device may alter the setting of one or more parameters of the secondary game such that the secondary game transitions from the first situation to the second situation. For example, for each symbol in the outcome, the gaming device may determine a related parameter, and an adjustment to be made to the parameter by reference to a database such as that illustrated in FIG. 11. In some embodiments, a database may associate entire outcomes with related parameters and with adjustments to be made to the parameters, rather than associating individual symbols with parameters.

Figure 12:
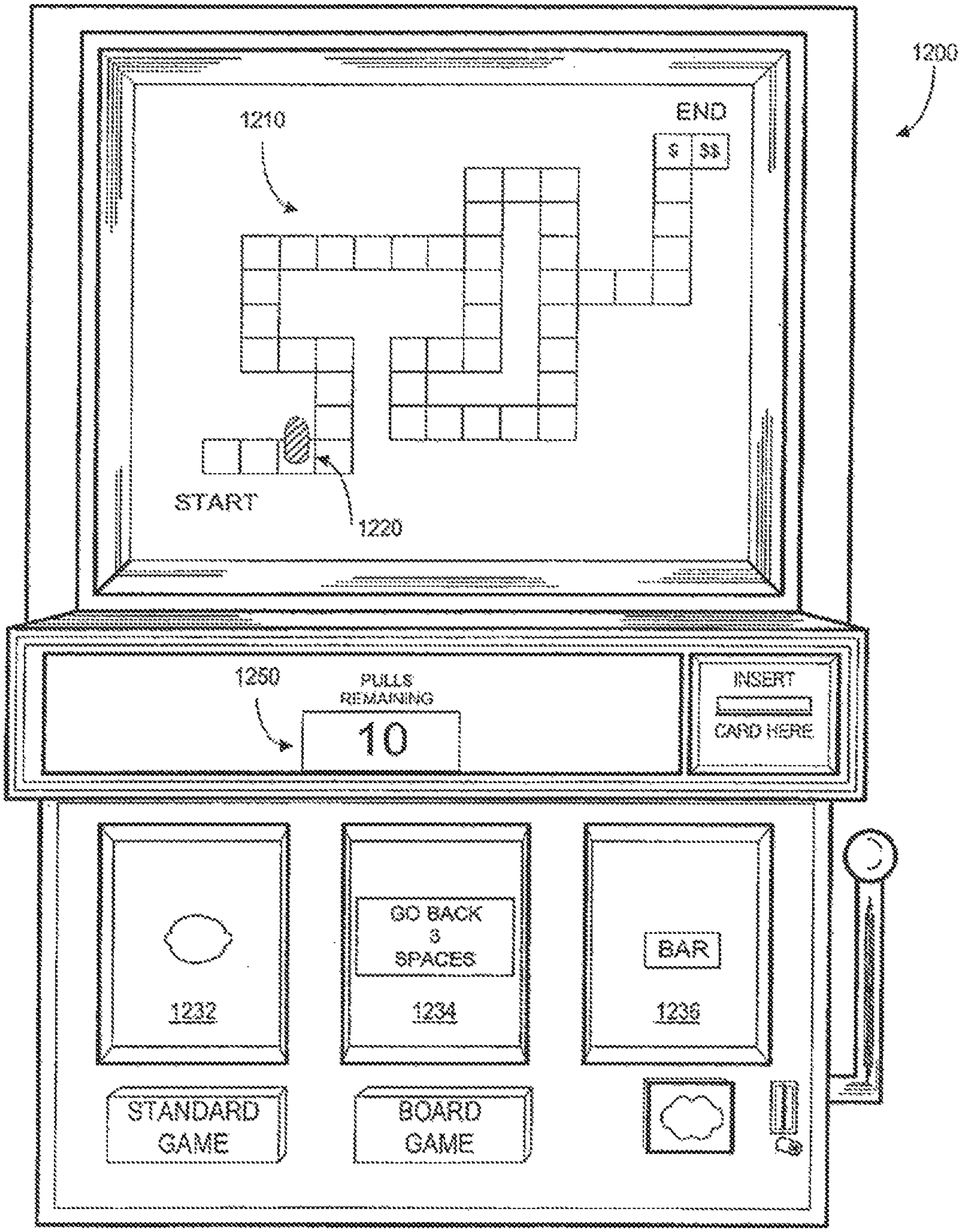
FIG. 12 is a front planar view of an illustrative gaming device, according to some embodiments.

FIG. 12 depicts an exemplary illustration of a gaming device according to some embodiments. Depicted are both a primary game, involving reels 1232, 1234, and 1236; and a secondary game involving game board 1210. As depicted, the current game situation in the secondary game includes a game character 1220 located at the third location on game board 1210 from the "START." The number of pulls remaining 1250 is "10". In other words, the player has ten handle pulls in which to achieve an objective in the secondary game. As depicted, one objective is for the game character to reach locations of the game board 1210 marked "$" or "$$" near the "END." In FIG. 12, reel 1234 illustrates an exemplary symbol from a primary game that may have an effect on a secondary game. The symbol, "Go Back Three Spaces," has the effect of moving game character 1220 three spaces back (e.g., three spaces towards the "START" side of the game board). The "Go Back Three Spaces" symbol may be considered part of a negative outcome since the outcome containing the symbol (i.e., the outcome "lemon-Go Back Three Spaces-Bar") sets the game character 1220 further back from its objective. Accordingly, the payment a player may expect to receive from the game may be reduced by the occurrence of the illustrated outcome.

Thus, in some embodiments, a gaming device may initiate a secondary game; determine a first situation of the secondary game; determine a second situation of the secondary game, in which the second situation is less favorable to a player than is the first situation: determine a first outcome; and set the situation of the secondary game from the first situation to the second situation, based on the outcome.

In various embodiments, a given situation of a secondary game may be associated with a guaranteed payment. A guaranteed payment is a payment that a player is assured of receiving should he complete a secondary game. For example, in one secondary game situation, a player may have already aggregated ten cherry symbols. The secondary game may provide that a player is to receive twenty coins for completing the game with at least ten cherry symbols aggregated. If, from the situation, there is no way for any cherries to be taken away, and there is no way for the payment associated with aggregating ten cherries to be reduced, then the player is guaranteed a payment of twenty coins. Thus, in some embodiments, a guaranteed payment is a payment that will be received by a player regardless of any future events or actions that occur in a game. A player may, in fact, receive more than the guaranteed payment. However, by definition, he cannot receive less.

In some embodiments, a secondary game may be associated with a conditional guaranteed payment. The conditional guaranteed payment may be a payment that a player is assured of receiving provided a particular condition in the secondary game is not met. For instance, a player may be guaranteed a payment of twenty coins, provided a "lose 10" symbol does not occur on the payline of the gaming device in a primary game. A conditional guaranteed payment may be a payment that a player will receive provided one of a set of predetermined outcomes does not occur (e.g., in a primary game).

As part of conducting a secondary game, a gaming device may display to a player a balance that indicates a number of credits that constitute a guaranteed payment, or a conditional guaranteed payment. For example, a display of a balance of "20" may indicate that a player is guaranteed to receive at least twenty coins upon the completion of the secondary game. Alternatively, the display of a balance of "20" may indicate that the player is to receive twenty coins upon the completion of the secondary game, provided one of a set of symbols or outcomes does not occur, and/or provided one of a set of other events does not occur. For example, a balance of "20" may indicate that a player is to receive a payment of twenty coins upon the conclusion of a game provided no "whammy" symbols occur in outcomes during the primary game. A credit balance displayed to a player may be adjusted and readjusted to reflect amounts that a player is guaranteed to receive, or conditional amounts that a player is guaranteed to receive upon completion of the secondary game.

In various embodiments, an outcome may be considered an unfavorable outcome, or a "negative outcome" if the expected payment associated with a second situation, immediately after the generation of an outcome, is less than an expected payment associated with a first situation of the game, the first situation occurring immediately prior to the generation of the outcome. In various embodiments, if an outcome leads to a second situation (e.g., by resulting in adjustments of one or more parameters governing play of a game), that is less favorable than a first situation, which occurred prior to the generation of the outcome, then the outcome may be considered an unfavorable, or "negative outcome". Examples of negative outcomes include outcomes that reduce the number of symbols aggregated by a player (e.g., reduce the setting of a parameter indicating a number of symbols aggregated) in a game in which a player must have a certain number of symbols aggregated in order to receive a payout. Other examples of negative outcomes include outcomes that set a game character back on a game board (e.g., that decrement the setting of a parameter indicating the location of a game character).

However, it should be noted that in some embodiments, a second situation may be less favorable than a first situation not because of the occurrence of a particular outcome, but because of some other event. In one example, a player participating in a secondary game transitions from a first situation to a second situation by making a handle pull of his gaming device. The player obtains an outcome of no particular moment, such as the outcome "blank-bar-cherry." Suppose that the outcome does not cause the setting of any game parameter to change. However, since a handle pull will have been completed, the setting of the "spins remaining" parameter of the secondary game will have been reduced by one. Accordingly, the second situation of the secondary game may be less favorable than the first, even though the outcome has had no particular effect. Therefore, to isolate the effects of a particular outcome on a secondary game, a first situation of a game may be compared to a second situation of a game with certain settings held constant. For example, a second situation of a game may be compared with a first situation of a game except that the setting of the "spins remaining" parameter in the second situation may be assumed be the same as the "spins remaining" parameter in the first situation of the game. The second situation can then be compared in terms of e.g., expected payment, with the first situation to determine whether the outcome has had a negative effect on the game situation. If the second situation (with certain settings assumed be the same as in the first situation) is determined to be worse than the first situation, then the worsening of the game situation can be attributed to the outcome, and not simply to the use of an additional handle pull, to the passing of time, or to some other factor. To be more precise, it is not the second situation that is compared to the first, but rather a third situation that is compare to the first, in which the third situation is identical to the second situation with the exception that a setting of a parameter of the third situation is the same as the setting for the parameter in the first situation, rather than in the second situation. Two typical settings for which parameters in the third situation are assumed to be the same as for parameters in the first situation are a "time remaining" parameter, and a "spins remaining" parameter.

Having described in general the meaning of a negative outcome in a secondary game, some specific effects of negative outcomes will now be described. In other words, negative outcomes will be described in terms of the specific parameters to whose settings the outcomes cause adjustments.

In various embodiments, an outcome, or a symbol in an outcome, may result in an adjustment to the setting of a parameter describing the amount of time available to complete a game. For example, an outcome may reduce the amount of time available to complete a secondary game from one minute to thirty seconds. The effect of an outcome may be to reduce the setting of a "time remaining" parameter by a certain amount of time, such as by thirty seconds. In some embodiments, the setting of a "time remaining" parameter may be reduced by an amount corresponding to an outcome, and also by an amount of time used to generate the outcome. For example, suppose a first situation of a secondary game includes a setting of a "time remaining" parameter of five minutes. A player then initiates a handle pull, and an outcome appears six seconds later. Further, suppose the outcome has the effect of reducing the setting of a "time remaining" parameter by thirty seconds. Then, following the generation of the outcome, a second situation of the game will have occurred in which the "time remaining" parameter is set to four minutes and twenty-four seconds, with time having been deducted due to an elapsed time and due to the effect of the outcome. A gaming device may determine a reduction of time associated with a symbol, or with an outcome, by reference to a database, such as the database of FIG. 11.

In various embodiments, an outcome may be said to be a negative outcome if the setting of a "time remaining" parameter of a secondary game is reduced by an amount of time that is greater than the elapsed time required to generate the outcome. In this way, it may be clear that the outcome has contributed to a loss of time remaining, not that time has simply elapsed during the generation of the outcome. Put another way, a negative outcome may cause a change in a game situation such that the difference between a first and second setting of a "time remaining" parameter may be greater than an elapsed time between the occurrence of the first and second game situations. Thus, upon the occurrence of a negative outcome, a gaming device may reduce the setting of a "time remaining" parameter by an amount associated with the outcome. In some embodiments, if the amount associated with the outcome is greater than the current setting of the "time remaining" parameter, then the setting of the "time remaining" parameter may be made to zero. The secondary game may thereupon have reached a state of completion.

In various embodiments, a time remaining in a game may indicate a time in which the player must, or has the ability to perform one or more actions. Such actions may include making handle pulls, making game decisions, or taking any other type of action. For example, a setting of a "time remaining" parameter of thirty seconds may allow a player to reap the benefits of the outcomes of any handle pull made in the next thirty seconds. In other words, a player may have thirty seconds in order to make handle pulls that help him reach an objective in the secondary game (although the handle pulls may turn out to hurt the player if they result in negative outcomes). Thus, for instance, a player may attempt to make as many handle pulls as possible in the next thirty seconds in order to obtain outcomes that advance a game character along a game board. In various embodiments, a "time remaining" constitutes a time available for a player to make up to a certain number of handle pulls, e.g., up to twenty handle pulls. The secondary game will then have reached a state of completion when either the player has made twenty handle pulls, or when the time remaining has fully elapsed. As mentioned, a time remaining may also require a player to make decisions within the time available. For example, the player must choose discards in a primary game of video poker, or must choose a particular path along a game board in a secondary game, each prior to the expiration of the time remaining.

Suppose that in a first situation of a secondary game, a player has a first amount of time remaining (e.g., thirty seconds remaining) in which to make ten handle pulls. The player may make a handle pull and may thereby reach a second situation of the game in which a certain amount of time has elapsed since the first situation, and in which a handle pull has been used. If certain outcomes have occurred during the handle pull, then additional time may be deducted from the setting of the "time remaining" parameter. The player may thus reach a second situation in which there is now a second amount of time remaining (e.g., twenty-eight seconds) and in which there are now nine handle pulls to make.

In various embodiments, a time remaining is a time available for a player to achieve a game situation in which a game character has reached a particular location on a game board (e.g., for the setting of a "game character location" parameter to reach a certain value). In various embodiments, a time remaining is a time available for a player to aggregate a certain number of game symbols or indicia. For example, the player may make as many handle pulls as he can in the time remaining in an attempt to aggregate ten cherry symbols.

In various embodiments, an outcome or other event may cause the number of handle pulls (i.e., spins) remaining in a secondary game to be reduced. For example, an outcome may include a symbol that reads "lose three spins". Accordingly, the "spins remaining" parameter may be decremented by three. An outcome may be considered to be a negative outcome, in particular, if a second game situation following a handle pull has fewer than one fewer handle pulls than a first situation occurring prior to the handle pull. In other words, the second situation not only has fewer "spins remaining" because a spin has been used up, but also because the outcome has caused the number of "spins remaining" to be reduced.

In one or more embodiments, a game situation may include a "defensive measure" or "defensive provision". As used herein, a defensive measure may include a parameter which negates, ameliorates, or otherwise reduces the negative effects of a symbol, outcome, or other event. As described in conjunction with FIG. 11, a "cherry lock box" is one example of a defensive measure, as a "cherry lock box" may protect cherry symbols already accumulated by a player from being taken away by a negative outcome, such as an outcome containing a "lose two cherries" symbol. The setting of a parameter describing a defensive measure may be a number, such as "0", "1", "2", etc., which indicates the number of such defensive measures possessed by a player. A defensive measure may be used up in counteracting the effects of a negative outcome. For example, in a game involving the traversal of a game board with chutes (which can set a game character further back on the game board), a defensive measure may be a bridge. When a game character lands on the entrance to a chute, the bridge may be placed over the chute, preventing the game character from falling in. However, the player may no longer have the ability to use the bridge. When a defensive measure is used up, the setting of the parameter describing the defensive measure may be used up. However, in some embodiments, a defensive measure may not be used up, but may remain even when it is used to counteract the effects of a negative outcome.

In particular, a defensive measure may function such that a player would be in a less favorable situation without having had the defensive measure than he would be with the defensive measure. For example, given a first game situation and the occurrence of a negative outcome, two possible additional situations may be considered. A second situation may occur based only on the effects of the negative outcome. That is, the settings of various parameters may be adjusted solely on the basis of the negative outcome. However, a third situation may occur based on the effects of both the negative outcome and a defensive provision. For example, the settings of the parameters in the first game situation may be adjusted based on both the negative outcome and the defensive provision. In the latter case, settings may be adjusted in a less unfavorable manner. For example, a negative outcome considered alone might reduce the number of cherry symbols aggregated by five. However, if the negative outcome is considered in conjunction with the defensive provision, then the number of cherry symbols may be reduced by only one. Thus, the defensive provision may have ameliorated the effects of the negative outcome.

Equivalently, suppose two similar situations (situations 1A and 1B) occur at a gaming device at different points in time (e.g., during different games). Situations 1A and 1B are identical except that in 1A a player has a defensive provision, and in 1B he does not. Suppose further that the same negative outcome occurs in both situations. The game starting in situation 1A then reaches situation 2A, and the game starting in situation 1B then reaches situation 2B. Because of the defensive provision of 1A, situation 2A will turn out to be more favorable than situation 2B, even though situations 1A and 1B were otherwise identical, and even though identical outcomes occurred for the two games.

In some embodiments, a defensive provision is so effective that a negative outcome has no effect on the game situation other than, in some cases, to eliminate the defensive provision. Thus, in some embodiments, upon the occurrence of a negative outcome, a game situation does not change except that the setting of a parameter describing a defensive provision is reduced by one.

In various embodiments, the layout of a game board may be changed based upon the occurrence of a symbol, outcome, or other event. A game board may include a number of locations (also referred to herein as “squares” or “spaces”) at which a game character may reside. As used herein, a game character may equivalently “visit” a location, “occupy” a location, or “reside” at a location. Further, the secondary game may include rules about how a game character can transition from one location to another. For example, from a first location, a game character may be allowed to visit only a second, third, or fourth locations. The actual location the game character does visit may depend on a random event (such as on an outcome of a primary game). One example of a rule describing possible transitions is a “chute” in a game involving chutes and ladders. A game character that lands on a location associated with a chute may automatically transition to another location. Thus, a chute constitutes part of a layout of a game board. In general, a layout of a game board may include a set of locations (e.g., a set of possible settings of a parameter describing a location) and, for each of the locations in the set of locations, a set of rules describing which other locations may be visited by a game character from the given location. Upon the occurrence of an outcome, such as a negative outcome, the set of locations may change. Additionally or alternatively, the set of rules describing the possible transitions may change. A layout of a game board may additionally include rules for how a game situation might change based on a game character’s landing at a particular location. For example, a location may be associated with a defensive measure. If a game character lands at that location, then the situation of the game may change to include a defensive measure.

It will be evident that a layout can change in such a way as to make a second game situation less favorable than was a first game situation prior to the change. For example, a layout may include many more chutes, or may include fewer possible transitions from one set of locations to another set of locations associated with e.g., payouts. For example, a game board may include a depiction of an island with only one bridge reaching the island. The island may constitute a favorable location, as a game character may retrieve treasure from the island. An unfavorable change in the layout of the game board may include the disappearance of the bridge, so that there is now no way for a game character to reach the island. In other words, the set of transitions between locations will have changed so that there is now no transition leading from any location to the island.

A layout may also change in that certain locations disappear from a game board, or become unavailable for visiting by a game character. To speak in terms of parameters, particular settings for a location parameter may become unavailable. It may be disadvantageous to a player if a particular location becomes unavailable, because such a location may confer an advantage upon a player. For example, a player may acquire a defensive measure if his game character visits the location.

In some embodiments, a transition associated with two locations (e.g., a transition from the first location to the second location) may have an associated probability. The probability may represent the probability with which a game character visiting the first location will transition to the second location. For example, a game board may contain a “fork in the road” from which a game character may take either a first path or a second path. Each path may have an associated probability. A random event may then determine which of the two paths a game character takes. For example, does the game character proceed from location one to location two (on the first path) or from location one to location three (on the second path)? In various embodiments, an outcome may alter probabilities associated with various transitions. For example, an outcome may include a “halve transition from square ten to eleven” symbol. Accordingly the probability of a game character who visits square ten also visiting square eleven (or proceeding in the direction of square eleven), may be cut in half.

In some embodiments, a secondary game involves obtaining puzzle pieces from the outcomes of primary games. As used herein “components” may also be used to refer to puzzle pieces or other parts of a whole that must be assembled. For example, various symbols may take the form of different shapes. When the symbols occur on the reels of the gaming device in the primary game, the symbols may be used to build a puzzle in the secondary game. In various embodiments, an outcome may alter the probability with which symbol arises on the reels in a primary game. For example, if a symbol comprising the bottom left-hand corner of a puzzle ordinarily occurs with probability 0.05, the probability may be reduced so that the same symbol now occurs with probability 0.02. Accordingly, it will be more difficult for a player to obtain this puzzle piece in the primary game, and it will therefore be more difficult for the player to complete the puzzle in the secondary game. Thus, an outcome that reduces the chances of a player obtaining a puzzle piece or other symbol needed or useful in a secondary game may constitute a negative outcome. It will be noted that there are many ways of reducing the chance of occurrence of a particular symbol. In one method, fewer such symbols are placed on the reels of a reeled slot machine. In another method, fewer random numbers are assigned to such a symbol, or an outcome containing such a symbol, in an algorithm for generating random or pseudo-random outcomes.

In various embodiments, a secondary game may include “resources”. As used herein, resources may include parameters that may aid a player during the future course of a secondary game. In particular, a resource may be a parameter that increases the expected payment from a game by giving a player potential to receive more credits or other value in the future. Examples of resources include: a shovel, that may allow a player to dig up more gold in a game; a boat, that may allow a player to cross an otherwise uncrossable gulf on a game board (e.g., to make a transition between locations that would otherwise be impossible); and a pick, that may allow a player to crack open a rock to reveal diamonds. A resource does not necessarily provide value directly to a player, but may aid the player in the future pursuit of value. For example, a shovel may never come in use unless a player reaches a location of a game board where there is buried treasure. However, since resources do aid in the obtainment of value, they are themselves of some value to a player. Accordingly, a negative outcome may include an outcome that causes a player to lose resources, such as shovels, picks, etc. A player may thereby transition from a first situation that includes a resource to a second situation that does not include the resource, in which the second situation is therefore less favorable than the first situation.

Various secondary games may include a grid of locations, the locations consisting of opaque symbols (such as squares) that conceal other symbols hidden underneath. A secondary game may involve various player selections of grid locations in order to reveal the symbols hidden underneath. A player may win payments by selecting grid locations that reveal particular symbols, or by picking combinations of grid locations that reveal particular combinations of symbols. For example, a player may pick three locations to reveal the symbols "bell," "bell," and "bell." The player may, accordingly, win a payout associated with the outcome "bell-bell-bell". In some embodiments, the player does not choose grid locations. Rather grid locations are chosen at random based on the outcomes of primary games. For example, a primary game may reveal text symbols of "b2," "c7," and "c14." The hidden symbols in grid locations "b2" (column "b", row "2"), "c7," and "d4" may then be revealed.

In various embodiments, a situation in a secondary game involving a grid of symbols may include parameters describing the number of a particular symbol hidden in the grid, and/or parameters describing the correspondence between hidden symbols and grid locations. For example, a "cherry" parameter may have the settings of "0," "1," "2," etc, indicating, respectively, that there are zero, one, two, etc. "cherry" symbols hidden in the grid, depending on what the setting actually is. A parameter might also describe a particular location. For example, there may be a "b2" parameter. A parameter describing a particular location may have settings that indicate the symbol hidden in that location. Thus, settings may include "cherry," "bar," "bell," etc. Thus, in some embodiments, a situation may change when a number of particular type of symbol changes (e.g., the setting of the parameter describing the number of "cherry" symbols changes from ten to eight), and/or when the setting of a parameter describing a particular location changes (e.g., from "lemon" to "bell"). It will be appreciated that there are other types of parameters that may also or alternatively define the situation of a secondary game involving symbols hidden behind grid locations. For example, there may be a parameter for each of a group of symbols, with each parameter having a setting such as "a2" or "b7" indicating the particular grid location behind which the symbol is hidden. Since particular symbols may be hidden behind particular grid locations, there may be said to be a "correspondence" between symbols and grid locations. A correspondence may describe all the relationships between symbols and grid locations. Thus, a correspondence may change when the symbol hidden behind one grid location changes.

As with other types of secondary games, the situation of a secondary game involving symbols hidden behind grid locations may change when the settings of any one of the parameters describing the game change. Thus, whenever the correspondence changes such that a different symbol is behind a particular location, the situation of the game changes. The situation may also change when the total number of a given symbol hidden in the grid changes. It will also be appreciated that some such changes may be unfavorable to a player. For example, if the number of a symbol that can form a valuable outcome decreases, then the player may be less likely to select the symbols necessary to achieve the valuable outcome. Accordingly, the grid will provide the player with a lower expected payment, and will thus be less favorable.

An additional element of a secondary game involving grid locations and hidden symbols is that a player may be given hints or knowledge as to what locations correspond to what symbols. A player with such knowledge may have a better chance of choosing more favorable combinations of symbols. For example, a player who knows where a "bell" symbol is hidden can first look for other symbols, and then choose the "bell" location only if he knows the "bell" will combine favorably with the other symbols to form a valuable outcome. In embodiments where a player has knowledge of the grid, an unfavorable outcome may be an outcome that causes the correspondence between hidden symbols and grid locations to change. When this correspondence changes, a player may lose his knowledge of where particular symbols are hidden.

In various embodiments, a secondary game may include a prize or payment value that is associated with reaching a particular objective. For example, if a character in a game reaches the final square of a game board, the player may receive a payout of one thousand coins. However, the payout associated with a particular objective may be a parameter of game play, like any other. Thus, the payout associated with reaching an objective may change based on the occurrence of symbols or outcomes in the primary game, or based upon the occurrence of other events. For example, if the player receives a particular outcome in the primary game, the payout associated with reaching the final square in a board game may be reduced to five hundred. Even though the player has not actually realized the payout (e.g., the player has not reached the objective yet) and even though the player may be unlikely to reach the objective, the change in a payout associated with an objective may constitute an unfavorable change in a game situation. This is because an expected payment to a player may now be lower, assuming the probability with which the player will reach the objective remains the same. Accordingly, a negative outcome may be an outcome that reduces the payout or prize associated with reaching a particular objective. A negative outcome may also reduce or eliminate some other value associated with a particular objective. For example, suppose that a player may obtain a defensive measure if his game character lands on the tenth square of a game board. A negative outcome may take away the possibility of achieving the defensive measure by eliminating the association between the tenth square and the defensive measure. Thus, even though the player has not even landed on the tenth square, the game situation may be less favorable because now the potential for achieving the defensive measure is reduced and, therefore, the expected payment from the game as a whole is reduced.

In various embodiments, a probability with which a player might reach an objective may also be a parameter of a game. For example, as mentioned, a situation of a game may include a probability with which a game character takes one fork of a junction over another. The altered probability may, in turn, influence the probability with which a game character will reach a destination square, such as the last square on a game board. If the probability has been reduced, and obtaining the objective confers a payout upon the player, then the reduction in probability constitutes an unfavorable turn of events. Thus, a negative outcome may reduce a probability of a player obtaining a favorable objective.

In various embodiments, an objective itself might change. For example, in a game involving the aggregation of symbols, the objective might change from aggregating ten symbols to aggregating twenty symbols. If it is less probable that a player will be able to meet the objective, then the change may be considered unfavorable for a player. Thus, a negative outcome may alter an objective of a game in a manner that is unfavorable to a player.

Various embodiments described above, among others, will be described in additional detail below. The present discussion generally follows broad method steps that may be performed by a gaming device in one or more embodiments of the present invention.

Establish Player Equity in a Gaming Device

Many embodiments of the present invention provide a gaming device where winning outcomes occur with a high frequency and/or winning outcomes pay, on average, much more (e.g., more currency) than is typical. For example, on a typical gaming device, a player might achieve a winning outcome on only 20% of handle pulls. However, in many embodiments of the present invention, a player might achieve a winning outcome on 60% or more of his handle pulls. As another example, on a typical gaming device, a player might win an average of three times his wager whenever he achieves a winning outcome, whereas, in the present invention, a player might win an average of ten times his wager whenever he achieves a winning outcome. To maintain the profitability of a gaming device that pays much more frequently than normal, or in much higher amounts then normal, many embodiments of this invention also provide for the occurrence of negative outcomes. Negative outcomes will be described at greater length below. However, one feature of negative outcomes is that they may cause a player to lose more than the typical amount of the player's wager. Thus, for example, a player might wager one coin, initiate a handle pull, and receive a negative outcome. As a result of receiving the negative outcome, the player might lose ten coins, even though the amount of his wager was only one coin. Typically, a player cannot lose more than his wager amount, because, for example, a gaming device cannot require a player to put in more money than he has wagered after the player already knows that he has lost. A player would simply walk away from the gaming device rather than put in more money that he knows the gaming device would certainly keep.

Therefore, in order that a gaming device may take from a player more than his original wager amount, the player must, in some embodiments, establish equity in the gaming device. Equity may be defined as any promise of value or potential value that the player has stored within the gaming device. Equity may include features of a gaming device or of a game played on the gaming device that contribute to a player's expected winnings.

In various embodiments, equity may include an amount of money the player has inserted into the gaming device. The amount of money the player has inserted may be indicated as a credit balance. Note that prior to each handle pull, the player may insert a certain minimum required amount of money into a gaming device. In this sense, the act of inserting money may be similar to wagering. However, in some embodiments, only a first portion of the amount inserted pays for initiating a handle pull, and, upon the occurrence of a negative outcome, a second portion of the amount inserted is lost. In a conventional gaming device, only the wager used for initiating the handle pull is ever lost, and there is no second portion of an original wager that is lost. Therefore, in contrast to a conventional gaming device, a gaming device of various embodiments of the present invention may require a player to have established sufficient equity to not only pay for the initiation of a handle pull, but also to pay should a negative outcome occur.

In various embodiments, equity may include an amount of money the player has won during play at the gaming device, but has not yet been paid to the player. This amount may also be indicated as part of a credit balance, or may be indicated as a separate "winnings balance."

In various embodiments, equity may include a bonus amount that the player is guaranteed to receive at some future point in time. The bonus amount may be conditioned upon some player activity, such as a minimum amount of play at the gaming device.

In various embodiments, equity may include a bonus prize that the player is guaranteed to receive at some future point in time. The bonus prize may be conditioned upon some player activity, such as a minimum amount of play at the gaming device.

In various embodiments, equity may include a number of credits with which the player has begun, or which the player has won during the course of a contracted period of play, but which the player cannot retrieve until the end of the contract period. For example, a player might enter into an agreement with the gaming device in which the player begins with one hundred credits, makes one hundred handle pulls, and then keeps the number of credits remaining after adding winnings and deducting wager amounts from the initial credit balance. In this agreement, the player's credit balance is a form of equity, even though the player has not necessarily paid $100 for his initial balance, and cannot cash out the credit balance until after the one hundred handle pulls have been completed.

In various embodiments, equity may include an amount of money the player has inserted into a gaming device in return for some consideration, where the player has not yet received the consideration. For example, the player has inserted $20 into the gaming device, and in returned received a promise of a $50 meal at the casino's restaurant. However, the player has not yet had the meal.

In various embodiments, equity may include the credit line of a player's credit card. The player may, for example, enter his credit card number into the gaming device using a keypad or other input device. The gaming device would then be authorized to charge the player's credit card upon the occurrence of a negative outcome.

In various embodiments, equity may include the amount of the player's friend's credit balance, or the amount of a credit balance held jointly between the player and his friend. For example, a player may enter the name of a friend into his gaming device. The player's gaming device may transmit the name to the casino server, and the casino server may then poll the gaming devices to which it is connected, in search of the friend's name. The friend's gaming device may read the friend's tracking card, and communicate to the casino server that the friend is present. The casino server may then direct the friend's gaming device to ask the friend whether he agrees to allow his credit balance to be used as equity by the player. If the friend agrees, then any negative outcomes achieved by the player may cause the player's friend to lose credits from his credit balance. In another example, a player and one or more friends share a common credit balance. Each may deduct the cost of initiating handle pulls from the common credit balance, and the winnings of each may be added back to the credit balance. Whenever the player or one of his friends receives a negative outcome, a corresponding amount of credits may be deducted from the commonly held credit balance. Of course, this embodiment applies to relatives, acquaintances, spouses, etc. of the player, not just to friends.

In various embodiments, equity may include a line of credit to be put onto the player's hotel bill. For example, when a player achieves a negative outcome, the amount of the negative outcome may be added to the players hotel bill.

In various embodiments, equity may include the player's comp points. For example, negative outcomes may cause a player to lose comp points from an existing balance of comp points.

In various embodiments, equity may include conditional agreements by a player to accept marketing offers. For example, a player agrees that if a negative outcome occurs, the player will switch his long-distance carrier. In this embodiment, the player's equity is his value as a customer. The player is willing to confer his value as a customer upon a merchant, by agreeing to do business with that merchant if the negative outcome occurs. A merchant would, in turn, pay the casino for the ability to acquire new customers. The casino, therefore, may receive its payment from a merchant, rather than from the player, when the player attains a negative outcome.

In various embodiments, equity may include conditional agreements by the player to perform work. For example, the player agrees that if a negative outcome occurs, the player will answer survey questions for the casino or for third party merchants who are paying the casino. Here, the player's equity is the value of his feedback and opinions to the casino and to third-party merchants.

In various embodiments, equity may include an agreement by the player to pay for any negative balances. For example, the player may sign an electronic signature pad of the gaming device so as to signify his agreement to pay the gaming device for any losses he incurs due to negative outcomes. If the player does incur losses, then his signature may constitute proof of his obligation to cover his losses.

Equity may include a player's level of progression towards an objective. Several examples of player objectives and related equity are described below.

In various embodiments, a bonus game or other secondary game may involve the traversal of a game board by a game character. The game character may move within the game board based on one or more of: the game character's current position; the outcome of a random or pseudo-random process; the nature of the game board, and player input. For example, the reels of a gaming device may reveal a number telling the game character to advance a certain number of spaces on the game board from its current position. Alternatively, a player may be given a choice, from which he might select to e.g., advance three spaces or advance five spaces. As described in the "Up and Down Game" example, the nature of the game board may also influence the game character's moves in that, for example, a chute or ladder may carry the game character far away from its current position. The objective of a game under consideration may include:

reaching a certain location on the game board (e.g., reaching one of the last several spaces in the "Up and Down Game" described above);

visiting each of a set of locations (e.g., visiting and buying three related properties in a Monopoly® type game);

remaining on a game board (e.g., not falling through a trap door);

traversing more spaces than are traversed by an opposing game character (e.g., in a racing game, traveling more spaces around a track than are traveled by an opposing game character representing the house").

In a game involving the traversal of a game board, one form of equity may be the position of a game character on the board. For example, if the objective of a game is to reach the later spaces on a game board, then a game character closer to the later game spaces will generally have a better chance of reaching such spaces than a game character which is further way. In the "Up and Down Game" example, a game character on the 85$^{th}$ space likely has a better chance of reaching the 100$^{th}$ space than does a character on the 20$^{th}$ space. In a game where a game character representing the player is racing against a game character representing the house, the position of the player's game character relative to that of the house's game character represents a form of equity in that the player is more likely to win the race the further ahead is his character. Thus, not only is the position of a player's game character a form of equity, but so is the position of an opposing game character. The opposing character might represent the house, or it might represent another player.

It should be noted that the position of a game character may represent equity even though the player would not be paid if the game were to end with the game character at its present position. For example, if a game character finishes on the 85$^{th}$ space in the "Up and Down Game", the player would not receive a payout. However, with a game character on the 85$^{th}$ square and several pulls remaining in a block of pulls purchased by the player, the game character has a good chance of reaching a square that will result in the player winning a payout. Therefore, the position of the game character constitutes equity in that it contributes to the player's expected winnings.

It should also be noted that a comparison of the equity present with a game character at two possible locations may assume that other factors are equal. For example, it may be said that there is a greater amount of equity in a game character occupying the 85$^{th}$ square than in a game character occupying the 12$^{th}$ square of a game board. However, such comparison may assume that in both cases, there are the same number of pulls remaining in the bonus game. The number of pulls remaining is a different form of equity, which will be discussed further herein.

In games where equity may take the form of a game character's position on a game board, a negative outcome may alter the game character's position in some deleterious fashion. For example, in the "Up and Down Game", a negative outcome may be a number on the reels such as "−2" or "−3" that causes the game character to move backwards on the game board rather than forwards. Deleterious effects may also derive from features built into the game board. For example, chutes create deleterious effects in that they cause a game character to fall further away from its destination.

The interaction of features built into a game board with symbols generated on the reels of a gaming device creates a situation where the same reel symbols might, under various circumstances, result in favorable or unfavorable alterations in a situation of a game. For example, a "+3" might have a favorable effect if it simply advances a player three squares on a game board. However, if the "+3" advances a player to the entrance of a chute, then the "+3" symbol may have an unfavorable effect. Similarly, a "−2" symbol might actually be favorable if it places a game character at the foot of a ladder.

In a game involving the traversal of a game board by a game character, another form of equity may be the layout or topology of the game board itself. For example, the presence of shortcuts between one part of the game board and another may aid the player's game character in reaching a desired part of the board more quickly. In the "Up and Down Game" described herein, ladders provide a shortcut by which a character may advance rapidly up the game board. A chute is another type of shortcut that may work against a player, setting the player's game character farther back on the game board. Thus, a negative outcome may be an outcome that removes a ladder from a game board, or that adds a chute. A negative outcome may also, for example, move the bottom or the top of a ladder to a less advantageous space on the game board, may move the top or bottom of a chute to a less advantageous space, or may widen the entrance of a shoot to encompass more than one space. With a wider entrance to a chute, a game character may have more opportunities to fall into the chute and to thereby be set further back on the game board.

In one or more types of games, a game character may reach a junction in a game board. From the junction, the game character may potentially proceed in two or more different directions. Additionally, it may be more advantageous for a player if his game character proceeds in a first direction rather than in a second direction. For example, one direction may take a game character along a path that goes for many spaces before reaching a desired destination. The other direction may take the game character along a path that goes for only a few spaces before reaching a desired destination. Thus, it may be preferable for the game character to take the second path rather than for it to take the first path.

If, when a game character reaches a junction, the player can improve the game character's chances of going down the more advantageous direction, then the player will have benefited. Thus, if a barrier is erected blocking off the less advantageous direction, thus forcing the game character down the more advantageous direction, then the player will have benefited. Additionally, if the path constituting the less advantageous direction became disconnected from the rest of the game path, then the player will have benefited. For example, a game board may comprise a network of interconnected sets of railroad tracks. A junction may constitute an area where a first set of railroad tracks and a second set of railroad tracks diverge in different directions. If the first set of tracks becomes disconnected from the set of tracks leading into the junction, then the game character is thereby forced to travel down the second set of railroad tracks. Alternatively, if a switch is set directing the player down the second set of railroad tracks, then the game character is also forced down the second set of railroad tracks.

In embodiments where a game board may have junctions, a negative outcome may introduce junctions onto a game board whereby the game character is given an opportunity to go down a less advantageous path than it would otherwise traverse. It may be assumed, in this embodiment, that a player would have no choice in the matter of which path a game character would follow. Instead, whether or not the game character does follow a less advantageous path may be determined by some random event, such as the spinning of the reels. The mere potential that a game character might have to traverse a secondary path that is less advantageous than a primary path may reduce a player's expected winnings. Another type of negative outcome may increase a game character's chances of traversing a less advantageous game path, possibly increasing such chances to 100%. For example, a negative outcome may throw a switch at a junction of railroad tracks, forcing a game character down a less advantageous path.

Another example of a junction may appear in the "Up and Down Game". In the "Up and Down Game", a ladder may contain a junction. For example, the ladder may have one bottom, but two different branches fanning out of the same bottom, with each branch having its top at a different space on the game path. If a game character lands on the space at the bottom of the ladder, then a further random process may be required in order to determine the branch of the ladder the game character will traverse. A negative outcome, obtained before the game character lands on the space at the bottom of the ladder, may influence the aforementioned random process in order to increase the game character's chances of taking the less favorable branch of the ladder, should the game character later and at the bottom of the ladder. Similarly, a chute may have two or more branches, and various negative outcomes may influence which branch would be taken by a game character should the game character ever land at the entrance of the chute.

In one or more embodiments, certain spaces or paths may be added or taken away from a game board. For example, a certain area on a game board may constitute an island in which treasure is buried. The only route to the island may be over a bridge. One or more outcomes may then result in the bridge being destroyed. The island would then be inaccessible to the player's game character, to the detriment of the player. On the other hand, one or more outcomes might result in one or more new bridges being built to the island. The player's game character might thereby be given better chances at obtaining the treasure.

It may be seen from the embodiments described herein, that one form of equity may lie in the layout and topology of a game board. A negative outcome may change the layout of a game board to the player's disadvantage. Such a negative outcome may work, for example, by adding shortcuts that work against the player, by removing shortcuts that work in the player's favor, by adding disadvantageous paths to a game board, and by removing certain advantageous paths. Of course, beneficial outcomes are also possible. A beneficial outcome may, for example, add a beneficial shortcut, remove a disadvantageous shortcut, add a beneficial path, or remove a disadvantageous path.

In various embodiments, an objective in a game, such as a bonus game or secondary game, may be for a puzzle to advance towards completion. Exemplary puzzles are those involving components that can be moved relative to one another. Such puzzles may include a Rubik's cube where, for example, twenty-seven smaller cubes are moved relative to one another. The puzzle reaches completion when each side of the larger cube is monochromatic.

Such puzzles may include a sliding the game, where each the has an associated number, and where tiles must be slid within a confined playing area. The puzzle reaches completion when the tiles are in numerical order. Such puzzles may also include a puzzle consisting of two types of game tokens, where all tokens are arranged on a linear playing area. Each token of a first type is allowed to move one space towards one end of the playing area, while each token of the second type is allowed to move one space towards the opposite end of the playing area. In addition, a token may jump over a single token of the opposite type. The puzzle reaches completion when the two types of tokens each reach their respective sides of the playing area without any tokens being stranded within the playing area.

In various embodiments involving puzzle games, a player may achieve a payout when a puzzle has reached completion, or when a puzzle has reached some other designated state (e.g., one side of the Rubik's cube has been completed). Therefore, the player's equity in such games may consist of the current state of the puzzle, and thus in the number of remaining moves required for the completion of the puzzle. For example, a player has greater equity in a Rubik's cube game where only one further move is required for completion than in a game where 10 further moves are required for completion. The equity is present even if a player would not be paid for the current state of the puzzle, since the current state of the puzzle still influences the player's ultimate expected payment. In puzzle games, a negative outcome may consist of an outcome that moves the puzzle further from completion. For example, a negative outcome may scramble a Rubik's cube that had been only two moves away from completion.

Note that puzzle games may include crossword puzzle games, jigsaw puzzle games, mazes, and any other type of puzzle game, particularly those in which there is a definite progression from any given state to a completed state.

In various embodiments, an objective of a game, such as a bonus game or secondary game, may involve the aggregation of symbols, tools, ingredients, properties, or other objects. Several exemplary games are described.

In a Pac-Man™-themed bonus game, a player's objective may be to gobble one thousand pellets.

In various games, certain symbols obtained on the reels in one or more primary games (e.g., spins of the reels) may be tracked and aggregated. Within one hundred spins, a player may have the objective of aggregating one hundred cherry symbols.

In a Monopoly™-themed bonus game, a player's objective may be to acquire all properties of a particular color grouping, thus forming a monopoly.

In a bonus game with a cooking theme, a player's objective may be to gather all the necessary ingredients with which to bake a cake (e.g., sugar, flour, eggs, water, oil, butter).

In a jigsaw puzzle-themed bonus game, a player's objective may be to gather all the puzzle pieces required to form a complete puzzle. For example, puzzle pieces that occur as symbols on the reels of the gaming device may be placed into appropriate places on the bonus screen, until the entire puzzle has been completed.

One form of a player's equity may therefore include the number of objects that the player has aggregated towards completing his objective. For example, in the Pac-Man™-themed bonus game, a player who has gobbled eight hundred pellets will generally have more equity than a player who has gobbled two hundred. In a game with a cooking theme, a player who has gathered the ingredients of sugar and flour generally has more equity than has a player with only sugar.

In games where a player aggregates objects, a negative outcome may cause the player to lose one or more aggregated objects. For example, in the cooking game, a "child" symbol might appear on the reels. An animation of the child may then start playing with the egg. The animated child may then drop the egg on the ground, breaking it. The "child" has thus served as a negative outcome in removing player equity that took the form of an egg.

Note that in games where a player must aggregate objects, certain objects may be more difficult to obtain than others. For example, in a cooking game, it may be much easier to obtain a "flour" symbol on the reels of a gaming device than it is to obtain a "cinnamon" symbol. Thus, a player who has obtained only a "cinnamon" symbol may be said to have more valuable equity than a player who has obtained only a "flour" symbol. Accordingly, a negative outcome that causes a player to lose one type of object may be more severe than a negative outcome that causes the player to lose another type of object, though the quantity of objects lost may be the same.

Once again it should be noted that a player may be said to have equity after having acquired certain objects, even if the player does not yet have enough objects to meet an objective (and to thereby receive a payout). The player may have equity simply because of the possibility of obtaining the remaining objects required to meet an objective, and to thereby receive winnings.

In various embodiments, a related objective to that of acquiring and aggregating objects, is to acquire objects that will potentially have a future use. In this case, a player's objective is not only to acquire objects, but also to realize a situation in which the objects can be put to use. Several examples are described below.

In a Monopoly™-themed bonus game, a player tries to acquire a complete color group. However, the player is then paid only if an opposing game character lands on the acquired color group. Therefore, the player's objective is not only to obtain the right number and type of properties, but also to have an opposing character and on them.

In a basic game (in which the player spins the reels of a gaming device), the player attempts to gather tools, such as a pick, a shovel, a bucket, and a treasure map. The player then hopes to achieve a bonus symbol so as to enter a bonus round. In the bonus round, the player will be on an island where he will have the opportunity to use his tools in order to find and dig for treasure. Therefore, the player's objective is not only to find tools, but also to obtain entry into the bonus round in order to use them.

In these examples, even though objects alone do not bring the player a payout, the objects a player has acquired may constitute equity. This is because the objects the player has may amplify the benefit a player receives should a particular situation occur in the future. Therefore, the objects do confer a positive expected payment upon the player. Accordingly, a negative outcome may serve to take from the player objects that have a potential future use.

In various embodiments, a game, such as a bonus game or other secondary game, may provide the player with one or more handle pulls in which to accomplish some objective. For example, in the "Up and Down Game" described herein, the player's game character has the objective of advancing along a game path. In the "Cops and Robbers" game described herein, the player's game character has the objective of robbing as many banks as possible, and of stashing money in a hideout before it is taken by cops. Evidently, the number of handle pulls allowed the player may be an important factor in the player achieving an objective. For instance, if typical symbols related to the "Up and Down Game" are "+1", "+2", and "+3", then a player's game character is unlikely to advance to the $100^{th}$ space of a game path on only a single handle pull. The player will typically require multiple handle pulls. Similarly, in the game of "Cops and Robbers", a player's game character will generally gather more money the more handle pulls the player has. In a game involving aggregation, a player will generally be able to aggregate more objects the more handle pulls he has.

Therefore, one form of equity a player may possess is a number of handle pulls remaining in which to achieve an objective. In many situations, more handle pulls constitutes greater equity. A negative outcome may accordingly take away handle pulls from a player. For example, a negative outcome may subtract three from a tally of "pulls remaining" for a player in a bonus or secondary game. Another type of negative outcome may negate the potential of handle pulls allowed the player. For example, in the "Cops and Robbers" game described above, a negative outcome is a "jail" symbol. Although the "jail" symbol does not explicitly take away handle pulls form a player, the "jail" symbol takes away most of the benefit of a handle pull, since the only payout allowed the player when in jail is the jackpot payout.

It may be noted however, that more handle pulls is not always better. For example, in the "Cops and Robbers" game, the robber may be in possession of a lot of money. Each handle pull allowed the player has the potential to bring up a "badge" symbol, after which a cop will take the money from the robber. Thus, more handle pulls may increase the chances of the player obtaining negative outcomes, and may therefore not always be beneficial.

In various embodiments, rather than receiving a set number of handle pulls in which to accomplish an objective, a player may receive a set amount of time. The player may then be allowed to make as many handle pulls as possible in the allotted time. Therefore, more time may also give the player more opportunities to accomplish an objective. Equity may thus take the form of a time remaining in a bonus game or other secondary game. Note that in one or more embodiments, a player with a lot of time remaining may nevertheless choose not to make any further handle pulls (e.g., because he fears a negative outcome). Thus, time remaining is not necessarily a liability for a player in situations where handle pulls remaining would be.

In various embodiments, a game at a gaming device may involve a grid with symbols or outcomes corresponding to one or more grid locations. A player may, for example, choose three grid locations corresponding to hidden symbols. The symbols behind the chosen locations may then be revealed and may form an outcome. The player may be paid based on the outcome. Alternatively, symbols in the grid may not be hidden. When symbols are not hidden, symbols may be chosen by a random process, so that a player is not able to simply pick the best possible symbols. Once chosen, symbols may be removed from the grid. Alternatively, especially if the player chooses grid locations, the symbols may remain but may be placed in different locations on the grid. The player may not be informed of such locations so as to prevent him from repeatedly choosing the same grid symbols.

One feature of a gaming device with a grid of symbols is that the same grid may be used for multiple handle pulls. As the player makes one or more handle pulls involving the same grid, he may learn more information about the grid. For example, in an embodiment where symbols are removed from a grid, a number of symbols may be chosen for the player that are unfavorable. However, once these unfavorable symbols are removed from the grid, the overall composition of the grid may become favorable for the player. Thus, the player may have an incentive to use the grid for future handle pulls. In embodiments where symbols are hidden and are not removed from a grid, a number of favorable symbols may initially be chosen for the player. The player may thereby infer that the overall composition of the grid is favorable. The player may therefore be encouraged to continue playing using the grid. In embodiments where a player may add symbols to a grid, such as by adding symbols obtained on the reels, the grid may become favorable when one or more favorable symbols are added (e.g., jackpot symbols).

In games that employ a grid of symbols, equity may take the form of a composition of the grid. For example, a grid that began with a random composition (e.g., a random mix of symbols), and from which a number of unfavorable symbols have been removed (e.g., blank symbols), may constitute valuable equity. The favorable composition of the grid may confer positive expected winnings upon the player in future games in which he uses the grid. Therefore, a negative outcome may include an outcome that alters the composition of a grid of symbols. The negative outcome may, for example, add unfavorable symbols, remove favorable symbols, replace all symbols with a random mix of symbols, and so on.

Note that equity may also take the form of player familiarity with a grid. For example, in an embodiment where all grid symbols are hidden, and where the player selects grid locations, the gaming device may occasionally provide hints to a player as to where one or more symbols are located. For instance, "There is a jackpot symbol in the upper right quadrant of the grid." A negative outcome may then scramble the locations of hidden grid symbols, thus obviating any knowledge the player had accumulated from hints.

In various embodiments involving games with negative outcomes, a player may obtain equity in the form of defenses to possible negative outcomes. For example, suppose a player has wagered ten credits in return for the opportunity to make twenty handle pulls at a gaming device. Over the course of the ten handle pulls, the player will try to build up a "win balance" while avoiding a "thief" symbol, which takes away half of the player's win balance. Prior to getting the "thief" symbol, a player may obtain a "security camera" symbol. The player may then be said to possess a security camera, and his possession of the security camera may be indicated by the presence of a "security camera" icon at the bottom of a display screen of the gaming device. Then, the next time a "thief" symbol appears, the security camera may provide a defense for the player. For example, the security camera may allow the player to keep his win balance in tact. Presumably, the security camera has allowed the thief to be detected before the thief could take half of the player's win balance. Of course, many other types of symbols may serve defensive purposes. For instance, a "safe" symbol might protect the players win balance by presumably allowing the player to store his win balance in the protected area of a safe. A "security guard" symbol may also provide protection against a "thief" symbol.

Defensive measures may apply to many other games as well. In the "Up and Down Game", a player may obtain a "cover" symbol. Then, when the player's game character lands on the entrance to a chute, the player may presumably place the cover over the entrance to the chute so that the game character does not fall in. In the "Cops and Robbers" game, the player may obtain a "bail bond" symbol. Then, if the player's game character is ever placed in jail, the player may use his bail bond to get out of jail immediately.

Defensive measures need not be complete. For example, when a "safe" is used to protect a player's win balance, a thief may perhaps drill a hole in the safe and extract a small portion of the player's win balance. Therefore, in the event of the occurrence of a “thief” symbol, a safe may result in the player losing only a quarter of his win balance rather than one half of his win balance. Defensive symbols may thereby reduce the severity of a negative outcome without completely eliminating its effects.

In one or more embodiments, a defense measure may work on a probabilistic basis. For example, suppose a player has obtained a “security camera” symbol. If a “thief” symbol later appears, then either of two scenarios may occur. In the first scenario, the security camera detects the thief and the player’s win balance remains in tact. In the second scenario, the security camera does not detect the thief, and the player loses half his win balance, the amount he would have lost even without the camera. The gaming device may choose randomly among the first and second scenarios, according to a predetermined probability mass function. For example, the first scenario has a 2/3 chance of occurring while the second has a 1/3 chance of occurring. Such a determination may be indicated by a further spinning of the reels, by the rolling of simulated dice, by the flipping of a simulated coin, etc.

In one or more embodiments, a defensive measure may work or not work according to a predefined schedule. For example, a security camera may work the first, third, fifth, etc., times a thief appears, but it may not work the second, fourth, sixth, etc., times.

As may be seen, defensive measures, including symbols that have been obtained by a player that may later be used to nullify the effects of a negative outcome, may be a form of equity. By reducing the chances of future loss, a defensive measure increases the expected winnings of a player. Accordingly, one or more negative outcomes may eliminate or nullify defensive measures that have been obtained by the player. For example, suppose a player has obtained a security camera to protect his win balance. A “hammer” symbol may later appear on the reels, and may cause the camera to be smashed. Additionally, negative outcomes against which the defensive measures were designed to protect may also eliminate the defensive measures. For example, a security camera retained by the player may disappear once a “thief' symbol appears. The security camera may therefore serve its defensive function, but may be used up” in the process. Of course, a security camera may last through the occurrence of more than one “thief” symbol. For example, a security camera may last through the occurrence of three “thief” symbols before disappearing.

Defensive measures may also disappear after a predetermined amount of time, or after a predetermined number of handle pulls, whether or not they are used. For example, the batteries for a security camera may run out after three handle pulls, after which the security camera will no longer serve as protection against a thief. Additionally, the effectiveness of a defensive measure may wane over the course of time, or over the course of one or more handle pulls. For example, one pull after a player receives a “safe” symbol, a “thief” symbol may be unable to take any of a player’s win balance. However, two pulls after a player receives a “safe” symbol, a “thief' symbol may be able to take a quarter of a player’s win balance.

In one or more embodiments, a player may have the option of using or not using a defensive measure. For example, in the “Cops and Robbers” game described herein, a player may not wish to have his game character get out of jail. Being out of jail might make the game character vulnerable to being caught by a cop again, when the cop might take money from the character that had not been taken previously. In one or more embodiments, the gaming device might choose, on behalf of the player, whether or not to use a defensive measure based, for example, on what would be most beneficial for the player.

In one or more embodiments, a defensive measure may take the form of a decoy. For example, in the “Cops and Robbers” game described herein, a player may obtain a look-a-like” symbol. A decoy game character may then appear. If a cop later appears, the cop may end up arresting the decoy rather than the real robber. In a game where a “thief” symbol may steal the player’s win balance, the player may have one or more decoy safe deposit boxes for in which his win balance is apparently concealed. In various types of games, a player may have the opportunity to spawn one or more supplementary processes. In general, a supplementary process may be defined as a secondary or parallel means by which a player may derive benefit at a gaming device. A supplementary process occurs at the same time as does one or more primary processes, such as the generation of reel outcomes across a single pay-line, or the conduct of a bonus game. A supplementary process thereby differs from a bonus game found on a typical gaming device in that the bonus game at a typical gaming device is the only process that is occurring at a given time. An analogy for a supplementary process may be found in the game of pinball. In pinball, a player may occasionally receive extra balls in addition to the primary ball. These extra balls bounce around and contribute to the player’s core. Another analogy may be found in the video game of Galaga™. In Galaga™, a player used a single game character to shoot down invading entities. However, occasionally the player may earn a supplementary game character. The supplementary character would then sit alongside the first game character, and the player would then have two guns pointed at the invading entities.

In various embodiments of the present invention, supplementary processes may take a number of forms. In an exemplary version of the “Up and Down Game”, a player may obtain supplementary game character. For example, a “game character” symbol may appear on the reels of the gaming device. The supplementary game character may then be placed on the game board at a different space than that of the primary game character. Throughout the rest of the game, any symbols or outcomes that apply to the primary game character may then also apply to the supplementary game character. For example, if the player obtains a “+3” symbol, than both the primary game character and the supplementary game character may advance by three spaces on the game board. Advantageously for the player, the player may now receive a payout if either game character finishes the game on one of the spaces marked with a payout. The player’s chances for receiving a payout are therefore significantly better.

In the exemplary game of “Cops and Robbers”, a player may also obtain a supplementary game character. Then, when a player receives a “bank” symbol, both characters may rob different banks, increasing the amount of money obtained for the player. Additionally, if a cop appears, the cop may only confiscate money from one of the game characters. Furthermore, if a “jail” symbol appears, then perhaps only one of the game characters will be arrested. Therefore, the presence of a supplementary game character may provide a number of benefits for the player.

In various embodiments, a player may win the right to benefit from an extra payline at a gaming device for a specified period of time. For example, for the next twenty pulls, a player may benefit from outcomes on two paylines for the price of playing one payline. Therefore, the enabling of the second payline serves as a supplementary process. As another example, in a game where a player prepays for twenty pulls in which one pay line will be used, a supplementary process may entail enabling a second payline for the remainder of the twenty pulls, with no further payment required of the player.

In various embodiments involving a game of video poker, a player may win the right to benefit from an extra hand of cards for a specified period of time. For example, for the next twenty pulls, for the price of playing three hands of poker, a player may also receive a fourth hand. The player may then win based on any of the four hands.

In some exemplary games, a player prepays for a specified number of handle pulls. During the handle pulls, the player may obtain one or more "egg" symbols on the reels. Upon the occurrence of an "egg" symbol, an egg will appear in a boiling pot illustrated on a screen of the gaming device. At the conclusion of the specified number of handle pulls, the player is paid for each egg, based on the number of handle pulls for which the egg has been boiling. Therefore, each egg the player obtains constitutes a new supplementary process, because each egg is boiling in parallel with the conduct of the primary game, and is earning a benefit for the player.

In some exemplary games, a player prepays for a specified number of handle pulls. Prior to making the handle pulls, the player may make an initialization handle pull in which he may obtain symbols representing one or more carrots. The carrots may then be placed in a garden. The carrots may then grow over the course of the handle pulls, and the player may later earn a payout based on the number of carrots he has at the end of the series of handle pulls. The player's task is complicated, however, by the possible appearance of "rabbit" symbols on the reels. The "rabbit" symbols may result in animated rabbits eating the player's carrots. In this exemplary game, each carrot may represent a supplementary process, in that the carrot earns a benefit for the player by lasting until the end of the game.

In various embodiments involving games with supplementary processes, the supplementary processes may be considered as a form of equity, since the supplementary processes may contribute to the player's expected winnings. For example, a supplementary game character may have the potential to generate extra winnings for a player. The ability to win payouts using an extra payline or an extra hand of cards also allows the player to generate extra winnings. The presence of eggs or carrots also gives a player the possibility of achieving greater winnings at the conclusion of a game.

Accordingly, in a game involving a supplementary process, a negative outcome may eliminate the supplementary process. For example, a negative outcome may cause a supplementary game character to be removed from a game board. In fact, once a supplementary game character is present on a game board, no distinction may be made between the first game character and the supplementary game character. Therefore, a negative outcome may remove any game character from a game board. However, in one or more embodiments, a negative outcome may not eliminate the last game character from a game board. A negative outcome may cause a player to lose the benefit of an extra payline or of an extra hand of cards. A negative outcome may also cause a player to lose one or more eggs, or to lose one or more carrots.

In various embodiments, a player may obtain equity in the form of any altered value of a variable that governs play at a gaming device. Such variables may include the payout for the outcome "bell-bell-bell", the probability of the outcome "cherry-cherry-cherry", the wager amount required to initiate a handle pull, the number of jackpot symbols present on the reels, and so on. For example, a player may obtain a symbol on the reels of the gaming device that doubles the payout for "bell-bell-bell" for the next ten handle pulls. The elevated payout for "bell-bell-bell" may constitute equity, because the elevated payout has increased the player's expected winnings on each handle pull. Similarly, if the probability of the outcome "cherry-cherry-cherry" is increased from its typical value to twice its typical value, the player will be more likely to win a payout corresponding to the outcome "cherry-cherry-cherry". Therefore, the increase in the probability will have added to the player's expected winnings. A decrease in the amount of a wager required to play a game at a gaming device may also constitute equity, since, with reduced expenses, a player's expected profits for a handle pull are increased (or his expected losses are decreased).

In various embodiments, negative outcomes may reduce equity that takes the form of altered values of variables governing play at a gaming device. For example, if a payout for a given outcome has been increased from a first value to a second value for the next ten handle pulls, a negative outcome may reduce the payout for the outcome back to its first value. A negative outcome might also reduce the payout for the outcome to a third value, which is greater than the first value but less than the second value. A negative outcome might also reduce the time over which an altered value for a variable is in effect. For example, if a payout for a given outcome is to be elevated for the next 10 handle pulls, the negative outcome may reduce the duration to only five handle pulls. Then, after five handle pulls, the payout may return to its typical value.

Note that a negative outcome may alter the values of one or more variables governing game play even when the values of such variables had not previously been altered in the player's favor. For example, suppose a player plays a game in which he purchases a block of ten handle pulls. He is then allowed to make ten handle pulls without making any further payment. The player may also receive any payouts corresponding to winning outcomes generated during the ten handle pulls. On his first handle pull, the player may receive a negative outcome that reduces the payout of the outcome "plum-plum-plum" to zero for the next handle pull. Thus, the player's expected winnings per handle pull from the gaming device are now lower than when he started play.

Once the player has established equity in the gaming device, equity may be taken from the player upon the occurrence of a negative outcome. In this way, the player can lose more than the original amount of his wager. If the player's equity in a gaming device ever goes below a predetermined threshold, then the player may be required to establish more equity in the gaming device so that negative outcomes can continue to be effective in maintaining the profitability of the gaming device for the casino. For example, a player's equity might consist of his credit balance. The player's gaming device may further have the potential of generating negative outcomes that take away ten credits from the player's credit balance. If the player's credit balance falls below ten credits, the negative outcome would not cause the player to lose 10 credits. Therefore, the player may be required to insert more coins into the gaming device so as to get his credit balance over 10 credits.

A player who does not have sufficient equity in a gaming device so as to allow for the occurrence of negative outcomes, may still be allowed to play the gaming device in a mode that does not employ negative outcomes. For example, the gaming device may act as a standard gaming device, where the player makes a wager, and cannot lose more than the amount of his wager. The pay table for the gaming device where negative outcomes are not being used may be quite different from the pay table when negative outcomes are being used. Thus, a gaming device may employ two distinct pay tables, one involving one or more negative outcomes, and one involving no negative outcomes. When a player who is playing a gaming device in "standard mode" (i.e. where there are not negative outcomes) builds up sufficient equity, the gaming device may offer to allow the player to play in "negative outcome mode". If the player accepts, then the pay table for standard mode, which had been backlit, may be darkened, while the pay table for negative outcome mode may become newly backlit. For example, a player might begin a session by inserting only enough coins on every handle pull to pay for that handle pull. However, in order to play using negative outcomes, the player must have a credit balance of at least twenty credits. Suppose that the player wins a payout of thirty coins. The payout is added to the player's credit balance. The gaming device may now offer to allow the player to play using negative outcomes. The offer may be made via text, audio, or any other mode of communication. In some embodiments, when the player has built up sufficient equity, the player's gaming device may automatically switch to negative outcome mode. Similarly, when a player who had been playing in negative outcome mode becomes low on equity, his gaming device may offer to allow him to play in standard mode. If the player does not accept, then the gaming device may require him to insert more credits.

In some embodiments, the gaming device may facilitate the building up of equity by withholding a portion of a player's payouts. For example, the gaming device may withhold:

- one coin from every payout of five coins or more;
- 5% of any payout;
- any payout that occurs immediately after a prior payout;
- any payout that is not the largest payout in a consecutive sequence of winning outcomes;
- any payout from a pay line that is not the highest-paying pay line on a given handle pull.

The total amount of any withholdings may be tracked by the gaming device, and may be displayed to the player as a separate balance. The separate balance may be labeled, for example, an "equity balance." Any negative outcome may then take away from the player's equity balance. At the end of a playing session, if the player still has any equity balance remaining, then the player may be able to cash out the equity balance. The gaming device may also require the player to insert coins or to allow the deduction of credits on a regular basis so as to build up an equity balance. For example, the player may be required to insert an extra coin every three handle pulls in order to build up an equity balance.

Note that one of the forms of equity mentioned above need not serve as equity in all embodiments. For example, a player may have a credit balance of twenty coins. However, the rules of operation of a gaming device dictate that the gaming device may never take coins from a player's credit balance unless the player specifically deducts such credits in order to make a wager. Therefore the player's credit balance does not serve as equity, but simply as a convenient form of cash for the player. However, the same player may be promised a bonus of fifty coins in one hour, should he maintain his rate of play at the gaming device. The promised bonus may serve as equity in that the gaming device may add or subtract from the amount of the promised bonus depending on the outcomes the player achieves.

Generate an Outcome

In one embodiment, the gaming device receives a wager from the player, receives a signal from the player to initiate a handle pull, and generates an outcome for the player in a manner similar to that of a conventional gaming device. For example, once the player has made a wager and pulled the handle of the gaming device, the processor of the gaming device provides instructions to spin the reels, generates a random number, matches the random number to a corresponding outcome (a set of symbols), and causes the reels to stop in such positions so that the generated outcome is displayed to the player.

Adjust the Player Equity in the Gaming Device Based on the Outcome

If the outcome is a winning outcome, such as cherry-cherry-cherry, or a full house, then the gaming device may add to the player's equity in the gaming device. For example, the gaming device may add five credits to the player's credit balance. However, a winning outcome need not result in a player's equity increasing. For example, the gaming device may pay a winning outcome in the form of coins dropped into the coin tray. In this case, the player's equity in the gaming device has not increased.

If the outcome is a negative outcome, then the player's equity may be reduced accordingly. In one embodiment, negative outcomes cause a player to lose a fixed percentage of his equity, such as his credit balance. For example, a negative outcome may take away 50% of a player's credit balance. A player with a balance of forty, upon attaining such a negative outcome, would end up with a balance of twenty. Negative outcomes may take away other percentages, such as 10%, 33.3%, 661%, 75%, or 100% of a credit balance. A negative outcome might even take away more than 100% of a credit balance. The player might then be responsible for any amount taken in excess of his credit balance. For example, in some embodiments, if 150% of the player's credit balance is taken, then the player loses his credit balance and must additionally insert a number of credits equal to half of what his credit balance had been. Alternatively, the player might pay the amount in excess of the amount of his credit balance using other equity. If a negative outcome would take away a fractional credit, then the number of credits to be taken may be rounded either in favor of the casino or in favor of the player. For example, if a player has a balance of eleven, and he receives a negative outcome that takes away 50%, then the player may end up with either five or six credits, depending on the rules of rounding that are applied. Alternatively, the casino may keep track of fractional amounts of credits that were not taken from the player, and may only take a full credit when the fractional amounts add up to a full credit. In another variation, the casino first takes a full credit for any fractional amount owed by the player, but allows the player to keep subsequent fractional amounts until they add up to the full credit already taken. One benefit of negative outcomes that take away a percentage of a player's credit balance, is that, so long as a player is not using up a credit to initiate each handle pull, the player's credit balance cannot go negative. For example, a player's credit balance may be cut in half 10 times in a row, but dividing a positive number by 2 will never make the number go negative. In some embodiments, however, a player's credit balance is allowed to go to zero. For example, a player with a single credit may go to zero if he gets a negative outcome that takes away 50% of a balance, even though fractional credits would normally be rounded in favor of the player.

The magnitude of a negative outcome may have a more complicated functional dependence upon a player's credit balance. For example, if the player's credit balance is one hundred or less, then a negative outcome takes away 50% of the balance. However, if the player's credit balance is more than one hundred, the negative outcome takes away only 33% of the player's credit balance. The magnitude of a negative outcome may be dependent on other factors as well. These factors may include:

- the time of day;
- the day of the week;
- the identity of the player;
- the player's status as a customer of the casino;
- the weather.

For example, a player who has visited the casino more than five times in the past year may be considered a good customer of the casino, and may therefore receive the benefit of negative outcomes which take away a relatively smaller proportion of his credit balance. As another example, if it is between 3:00 am and 7:00 am, then the casino may want to encourage play, and therefore negative outcomes may be of a smaller magnitude than usual.

Negative outcomes may be depicted with the addition of new symbols to existing gaming devices. For example, "thief" symbols could be added to the reels of a gaming device. Then, a negative outcome would be indicated by the appearance of at least two thief symbols across a pay line. Alternatively, existing symbols of a gaming device could be used to indicate negative outcomes. For example an ordinarily meaningless symbol combination, such as orange-bell-bar, might represent a negative outcome. In some cases, one or more blanks may represent a negative outcome.

The following example illustrates how the use of negative outcomes can allow a player to win more frequently, without changing the payouts of outcomes, and without altering the payback percentage of the gaming device. The payout structure of a typical slot machine, taken from Jim Regan's Winning At Slot Machines, is reproduced below:

The outcome now occurs on five thousand hits of the cycle, whereas previously it had occurred on just six hundred eighty hits of the cycle. The total length of the cycle has not changed, remaining at ten thousand six hundred forty-eight. The win frequency can be shown to have increased to approximately 60.1%. Meanwhile, the payback percentage of the gaming device has not changed. A payout structure such as the one above may prove to be more exciting to a player, since he now wins more often than he had with the original payout structure.

Note that the negative outcome could also have been made, for example, a "lose 50% of your balance" outcome. Then, the above payout structure would be accurate only when the player had a balance of twenty coins. Otherwise, for example, if the player had a balance of thirty, the negative outcome in the above payout structure would read −15, and the gaming device would have a different payback percentage than 94.5%.

One advantage of having a negative outcome whose magnitude is dependent on the player's balance, is that a player may be given a large number of handle pulls for a fixed price, without the large number of handle pulls necessarily being a liability for the casino. This is because, over the long run, a player's balance might tend towards an equilibrium balance, and not increase unboundedly. To illustrate, suppose a negative outcome takes away 50% of a player's credit balance, while all of the winning outcomes are fixed at a particular number of coins. When the player has a high credit balance, the negative outcome will have a relatively more significant impact, and the player's expected return from any spin will be negative. Therefore, the player's credit balance will tend downwards. However, when the player has a low credit balance, the impact of the negative outcome will be relatively minor. The effects of the winning outcomes will outweigh the effects of the negative balance,

| Outcome | 0 | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|
| Hits | 8570 | 680 | 680 | 200 | 200 | 68 | 20 | 42 | 6 | 42 | 20 | 5 | 50 | 4 | 20 | 20 | 20 | 1 |

The win frequency of a slot machine may be defined as the percentage of handle pulls in which the player can expect to achieve a winning outcome. The win frequency may be derived by summing the number of hits for a winning outcome that are contained within a cycle, by the total length of the cycle. In the case of the above payout structure, the win frequency is:

(#Hits for first outcome paying 2+#Hits for second outcome paying 2+ . . . +#Hits for outcome paying 100)/(Length of cycle)=(680+680+ . . . +1)/10648≈19.5%

Now, the above payout structure will be modified to include the addition of a negative outcome. The new payout structure is as follows:

and so the player will have a positive expected return on every handle pull, and his balance will tend upwards. For some balance, termed an equilibrium balance, the effects of the negative outcome and the winning outcome will cancel each other out, and the player will have an approximately zero expected payback on every spin. Over the long run, the player's credit balance will tend to fluctuate about the equilibrium balance. Therefore, a casino may provide the player with a relatively large number of pulls, for a relatively small upfront price, knowing that the player's credit balance will tend to remain in the vicinity of the equilibrium balance, and not grow continually. A player may even receive a large number of pulls that are then executed very rapidly by the gaming device. For example, the player may receive five

| Outcome | 0 | −10 | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|---|
| Hits | 3386 | 864 | 5000 | 680 | 200 | 200 | 68 | 20 | 42 | 6 | 42 | 20 | 5 | 50 | 4 | 20 | 20 | 20 | 1 |

The new payout structure includes a negative outcome that causes a player to lose ten coins from his credit balance. Note also that the new payout structure allows the first outcome paying two to occur much more often than it had.

thousand pulls, all of which are executed by the gaming device in the span of two minutes. The gaming device might then pay the player the amount of any remaining credit balance after five thousand pulls.

The following is an exemplary calculation of the equilibrium balance, $B_{eq}$, when a negative outcome takes away 50% of a player's balance, B. The payout structure with the negative outcome is reproduced below, only now the negative outcome is −0.5B.

| Outcome | 0 | −.5B | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|---|
| Hits | 3386 | 864 | 5000 | 680 | 200 | 200 | 68 | 20 | 42 | 6 | 42 | 20 | 5 | 50 | 4 | 20 | 20 | 20 | 1 |

The equilibrium balance $B_{eq}$ occurs when a player does not make a wager to initiate a handle pull, and when the expected payout on a handle pull is zero. Therefore, the following equation sets the expected payout equal to zero:

$$EV = (\text{prob of } 1^{st}\text{ outcome})\times(\text{payout of } 1^{st}\text{ outcome}) + (\text{prob of } 2^{nd}\text{ outcome})\times(\text{payout of } 2^{nd}\text{ outcome}) + \ldots + (\text{prob of last outcome})\times(\text{payout of last outcome}) = 3386/10648\times 0 + (\text{prob of negative outcome})\times -0.5B_{eq} + 5000/10648\times 2 + \ldots + 1/10648\times 100 = 0$$

Rearranging the equation above, to isolate $B_{eq}$ gives:

$$(\text{prob of negative outcome})\times 0.5B_{eq} = 3386/10648\times 0 + 5000/10648\times 2 + \ldots + 1/10648\times 100$$

$$B_{eq} = (1/0.5)/(\text{prob of negative outcome})\times(3386/10648\times 0 + 5000/10648\times 2 + \ldots + 1/10648\times 100)$$

$$B_{eq} = 21(864/10648)\times(3386/10648\times 0 + 5000/10648\times 2 + \ldots + 1/10648\times 100)$$

$$B_{eq} \approx 43.3$$

The following is a list of some other exemplary effects of a negative outcome:

- The amount of a guaranteed bonus is reduced. For example, if a player was guaranteed to receive $50 at the end of an hour of play, the player might now be guaranteed to receive only $40.
- A lower valued prize is substituted for a prize that had originally been guaranteed to a player. For example, rather than being guaranteed a one-night stay in a suite of the casino, the player is guaranteed only a one-night stay in a regular room.
- The player's winnings balance is reduced.
- The amount of money a player had inserted into a gaming device prior to initiating a handle pull is reduced or taken completely.
- The amount of consideration due to a player is reduced. For example, if the player has inserted $20 to receive a promise of a $50 meal, the $50 meal may become only a $40 meal.
- The quality of a player's comp is reduced. For example, the player may have a comp for a meal at a gourmet restaurant. However, as the player receives negative outcomes, the player's comp may become a dinner at the steakhouse, then a meal at the coffee shop, then a buffet, then a free item at the snack bar, and then nothing.

Determine Whether the Player May Retrieve his Remaining Equity

A player may be restricted as to when he can retrieve the equity in his gaming device. For example, the player might be engaged in contract play, where he may only cash out his credit balance after having made a predetermined number of handle pulls, or after having played for a required period of time. A player may be guaranteed a bonus payout, but only after having completed a required amount of play, such as five hundred handle pulls, or one hour of play. A player's equity might be a prize (e.g. a free $50 dinner) that he can only retrieve at a particular time (e.g. at dinner time).

Therefore, in this step, the gaming device may determine whether the player may retrieve his remaining equity. For example, the gaming device determines whether the player has completed the number of handle pulls required for a contract, or whether the player has completed the required amount of play to receive a guaranteed bonus.

In one embodiment, a player may not yet be eligible to retrieve his remaining equity. For example, the player has made only eighty of the one hundred pulls required in an agreement. However, the player may still be allowed to retrieve a portion of his equity. For example, if the player has a credit balance of fifty credits eighty pulls into a one hundred-pull contract, the player may be allowed to retrieve forty credits. By retrieving equity early, the player may forfeit any remaining amount of equity.

In some embodiments, the gaming device may even provide the player with extra equity if he retrieves his equity early. In this way, the gaming device may free itself up for other players.

Provide the Player with his Equity

If the player may retrieve his remaining equity, the gaming device may provide the equity to the player. In some embodiments, the gaming device only provides the equity upon the request of the player. The player may, optionally, continue playing even if he has the capability of retrieving his equity.

Alternative Methods and Uses

Various embodiments of the present invention have been described at length with respect to the functions of the gaming device. However, the central server may perform any one or more functions of the gaming device, including tracking or storing player equity. The central server may allow a player to move from one gaming device to another, without the player having to retrieve his equity from the gaming device. Rather, the central server can facilitate the transfer of equity from one gaming device to another, e.g. by communicating to the first gaming device that it no longer may provide equity to a player, and by communicating to a second gaming device that it now may provide equity to a player.

In various embodiments, at any given time, a player may have the option of banking the full or a partial amount of equity he has established in a gaming device.

In various embodiments, a player need not make a wager prior to initiating a handle pull. The player may simply establish equity in the machine, and then have a portion of such equity deducted upon the occurrence of a negative outcome.

In various embodiments, the magnitude of a negative outcome depends on the number of times the negative outcome has occurred in the past. For example, the first time a negative outcome occurs, it might cause the player to lose ten credits. The next time it occurs, the player loses twenty credits. The third time the negative outcome occurs, the player loses forty credits.

The magnitude of a negative outcome may increase by a fixed amount each time the negative outcome occurs. For example, each time the negative outcome occurs, the player loses five more credits than he had lost the last time the negative outcome occurred.

The magnitude of a negative outcome may increase by a fixed percentage. For example, the magnitude of the negative outcome increases by 50% each time it occurs.

The magnitude of a negative outcome may decrease by a fixed amount each time the negative outcome occurs. For example, the player may lose ten credits the first time a negative outcome occurs, lose nine credits the second time, eight credits the third time, and so on.

The magnitude of a negative outcome may decrease by a fixed percentage each time the negative outcome occurs. For example, the magnitude of the negative outcome decreases by 10% of its previous value each time the negative outcome occurs.

The magnitude of a negative outcome may increase by a random amount each time the negative outcome occurs.

The magnitude of a negative outcome may decrease by a random amount each time the negative outcome occurs.

In various embodiments, there are many other ways in which the magnitude of a negative outcome may vary. The magnitude of a negative outcome may depend not only on the number of times with which it has occurred in a player session, but also based on when it has occurred. For example, suppose a first negative outcome occurs on pull number one, and causes the player to lose ten credits. If the next negative outcome occurs on pull number two, then the player might lose eight credits. However, if the next negative outcome occurs on pull number three, then the player might lose six credits. The magnitude of a negative outcome may both increase and decrease within the same session. For example, the magnitude of a negative outcome may alternate between −10 and −20. In some embodiments, the negative outcome may occasionally be a winning outcome for the player. For example, nine out of ten times, a negative outcome takes away twenty credits from a player. However, one out of ten times, the negative outcome gives the player more credits.

In some embodiments, a player's equity may expire over time. For example, every minute, a player may lose a credit from his credit balance. In another example, starting thirty seconds after the resolution of his last handle pull, the player loses a credit from his balance for every ten seconds in which he does not initiate the next handle pull. This embodiment may be useful where a player has paid a fixed amount of money upfront in order to play for a fixed amount of time, begun with a certain number of credits, and where after the fixed amount of time the player gets to keep any remaining credits. If the player has a high credit balance towards the end of the time period, the player may be inclined to slow down his rate of play so as to avoid negative outcomes. By allowing player equity to expire, especially when the player is not initiating handle pulls, the player is discouraged from avoiding play.

In some embodiments, a player's equity may expire as a function of the number of handle pulls. For example, the player loses one credit every five handle pulls. In some embodiments, the player's equity may grow as a function of time, or handle pulls. The pay table of the gaming device may counterbalance the effects of expiring or growing equity. For example, if player equity expires, the player may have a relatively more favorable pay table. If equity grows, the player may have a relatively less favorable pay table. In some embodiments, equity grows as a function of time in order to reward the player for his play. Thus, a player who has played for many hours may have a large equity balance. A player may also carry over an equity balance from one session to another.

When a gaming device has the potential to generate negative outcomes, such potential may be clearly displayed, e.g. with a lit sign on top of the gaming device.

In some embodiments, negative outcomes do not have an effect until a threshold number of them have occurred. For example, a negative outcome occurs when any "thief" symbol appears on the pay line of a gaming device. When a player first achieves a thief symbol, a symbol of the thief appears in the lower right hand corner of the display screen of the gaming device. When the player next achieves a thief symbol, a second thief symbol appears in the bottom of right hand corner of the display screen of the gaming device. Finally, when the third thief symbol appears, the player loses 30 credits. However, now the thief symbols in the bottom right hand corner of the display screen disappear, and the player needn't worry until he achieves another three symbols.

In some embodiments, the effects of a first negative outcome are conditional upon the occurrence of a second negative outcome. For example, a player may accumulate any number of thief symbols in the lower right hand corner of his gaming device. However the thief symbols have no effect until the player obtains a "super-thief" symbol. When the super-thief symbol occurs, the player loses 10 credits for every thief symbol he had previously accumulated.

In various embodiments, a player may have a separate equity account, or balance, as mentioned above. The player may add or subtract from this equity balance at will. For example, the player may add credits to his equity balance, or cash out credits from his equity balance. The player may have a separate credit balance for placing wagers. The player may also add or subtract from his credit balance at will.

In various embodiments, a negative outcome may have a variable impact depending on the time or on the handle pull during which it is obtained. For example, suppose a player purchases a block of twenty handle pulls. The player will have a running win balance that will change based on the outcomes achieved using the handle pulls. If, in the present example, a player obtains a negative outcome (e.g., a "thief" symbol), in the first ten pulls of the block, then the player may lose 50% of his current win balance. However, if the player obtains the same negative outcome during the last ten pulls of the block, then the player may lose 75% of his win balance. In embodiments where the impact of a negative outcome varies over time, the impact of the negative outcome may be displayed to the player. For example, prior to making a handle pull, a displayed pay table may change to show that a "thief" symbol, if obtained in the current handle pull, will take away 60% of the player's win balance. Then, prior to the subsequent handle pull, the displayed pay table may change to show the thief taking away 70% of the player's win balance. In one or more embodiments, a player may only discover the impact of a negative outcome after it occurs. For example, a "thief" symbol may occur, and then the gaming device may display a message, "Sorry, you lose 50% of your win balance."

In one or more embodiments, a negative outcome may have a different impact depending on the player's speed of play. For example, a "thief" symbol may take away 50% of the players win balance if his rate of play over the last three minutes has averaged more than ten handle pulls per minute. However, the "thief" symbol may take away 70% of a player's win balance if the player has averaged less than ten handle pulls per minute. The gaming device may display to the player the current potential impact of any negative outcome that might occur. The gaming device may further display to the player the player's current rate of play. In this manner, the player may see the correlation between his rate of play and the potential impact of a negative outcome, and may be encouraged to play more quickly. Also, the gaming device may explicitly inform the player of the relationship between his rate of play and the potential impact of a negative outcome. The operator of a gaming device may benefit from the player's increased rate of play since an operator's profits are typically proportional to the number of handle pulls made on a gaming device. Therefore, in return for an increased rate of play on the part of a player, a casino operator may be willing to provide the player a benefit in the form of the reduction in impact of a negative outcome.

In various embodiments, a supplementary process may be a business that is set up by a game character. The business may be legitimate or otherwise. For example, in the "Cops and Robbers" game described herein, the robber may set up an illegal speakeasy (e.g., upon the occurrence of a "speakeasy" symbol). The robber may then earn money for every handle pull in which the gambling joint is operating. A negative outcome may then result, for example, in a cop raiding the gambling joint and shutting it down.

In one or more embodiments, a player may pay for equity. For example, in a game involving the traversal of a game board, a player may pay to have his game character's location altered. In the "Up and Down Game" described herein, the player may pay, for instance, to have his game character begin on space fifty of the game path rather than on space one. In a game where a player has a limited amount of time, or a limited number of handle pulls, a player may pay for more time or for more handle pulls. In a game involving the advancement of a puzzle towards completion, the player may pay for the puzzle to advance towards completion by one or more moves. In a game involving the assembly of a jigsaw puzzle, the player may pay to obtain one or more pieces of the puzzle. In a game involving the aggregation of objects, the player may pay for one or more such objects.

In various embodiments, a player may pay for defensive measures. In one or more embodiments, a player may pay for a defensive measure after having received a negative outcome. For example, in the "Cops and Robbers" game described herein, the player may pay for a "bail bond" symbol after his game character has been arrested and thrown in jail. The player may then be able to get his character out of jail. However, defensive measures that are purchased after a player has received a negative outcome (and e.g., which can be used to defend against the negative outcome) may be more expensive than the same defensive measures purchased prior to the player's receiving a negative outcome.

In one or more embodiments, it may be desirable to determine a value associated with a particular game situation. The value may correspond, for example, to the expected winnings of a player who finds himself in the particular game situation. For example, a player of the "Up and Down" game may have nine handle pulls remaining and may have a game character occupying square forty-four of the game path. It may be desirable for an operator of the gaming device to determine, for example, the player's expected winnings in the current "Up and Down" game given the player's current game situation. As another example, a player may have twelve handle pulls remaining in a game that involves the aggregation of "cherry" symbols. The player may have thirty-five "cherry" symbols aggregated so far, where a minimum of forty such symbols are required in order to win a payout at the end of the game. It may be desirable for an operator of a game to determine the player's expected winnings from his current situation in the aggregation game.

One reason for determining the player's expected winnings might be that a player may be given the opportunity to quit the game early and to receive a payment based on his expected winnings. For example, if a player's expected winnings given his current game situation are twenty credits, he may be allowed to quit the game without making any remaining handle pulls, and may receive an immediate payment of nineteen credits. Another reason for determining the expected winnings of a player in a particular game situation is that a player may be given the opportunity to pay to start a game at the particular game situation in question. For example, the player may be allowed to start the "Up and Down" game in a situation where the player has nine handle pulls remaining and where the player's game character occupies square forty-four of the game board. The player's payment may then be based on what the player's expected winnings for the particular game situation would be. For example, if the player would be expected to win 20 credits with 9 pulls remaining and starting on square forty-four, then the price for starting the game in such a situation might be twenty-one credits.

To determine a value, such as an amount of expected winnings for a player, associated with a particular gaming situation, a gaming device or operator of the gaming device may perform a simulation. Simulations may include simulations performed by a general-purpose computer, simulations performed by a gaming device (e.g., the gaming device enabling play of the game being simulated), or simulations performed by a human in conjunction with a gaming device.

To perform a simulation using a general-purpose computer, an operator may program the game rules, structure, and other game parameters into the computer. Game parameters may include, for example, the amount of winnings a player will obtain for any ending game situation. For example, a player receives thirty credits if his game character finishes on square eight-two of the game path. In addition, game parameters may include a pay table used for each individual handle pull remaining. In other words, a player may win payouts that are paid prior to the ending of the game. The potential for such payouts might factor into a determination of the player's expected winnings for the remainder of the game. The operator may also program the current game situation into the general-purpose computer.

The operator may then instruct the general-purpose computer to simulate the playing of the game from the current game situation for a given number of iterations. For example, if the general-purpose computer is to simulate the playing of the game for one hundred iterations, then the computer may begin one hundred times at the current game situation, and for each of the one hundred times may randomly generate outcomes corresponding to the nine handle pulls remaining in the game. Then, for each of the one hundred iterations, the general-purpose computer may determine player winnings obtained in the last nine handle pulls of the game. Player winnings may result both from the final position of the player's game character, and from any winnings derived from the outcomes obtained on the reels of the gaming device. The general-purpose computer may then average together the one hundred amounts generated for player winnings. The average may then be assumed to represent the player's expected winnings for the game from the current game situation. Of course, any number of iterations may be used in the simulation. In general more simulations will tend to produce a more accurate estimation of a player's expected winnings.

Simulations may similarly be performed on a gaming device. Advantageously, the gaming device enabling the current game may already have the game rules, the game structure, and other game parameters programmed within an internal memory. The gaming device may then be instructed to automatically generate outcomes corresponding to a given number of iterations, with e.g., nine handle pulls being generated per iteration. In one embodiment, the gaming device does not display to the player the outcomes generated as part of the simulation. Rather, the outcomes may be generated internally without a corresponding movement of the reels. Similarly, the outcomes may have no effect on the player. Instead, the gaming device may track the effects the outcomes would have on the player were they to actually count. As with the embodiment using the general-purpose computer, the gaming device may determine an amount of player winnings for each iteration of the game. The gaming device may then average all such player winnings to determine an approximation to a player's expected winnings for the current game.

In one or more embodiments, a gaming device does not perform simulations automatically. Instead, an operator of the gaming device may manually play the gaming device over a number of iterations. The operator may thus insert coins, and physically initiate handle pulls. The operator may be able to configure the gaming device always to begin from the game situation being simulated (i.e., the player's current game situation). Alternatively, the operator may only attach significance to those iterations in which the game situation matches the player's current game situation. Having performed a desired number of iterations, an operator may average the amounts won from each significant iteration, and may thereby determine an approximation for a player's expected winnings from his current game situation.

It should be noted that the simulations described herein may be characterized as Monte Carlo simulations.

In one or more embodiments, a negative outcome may also correspond to some positive benefit for a player. When a negative outcome also carries a positive benefit, a player may not be as disappointed at receiving the negative outcome as if he would have been without the positive benefit. The positive benefit may be particularly effective in boosting the player's morale if the benefit confers upon the player a different type of equity or other benefit than is taken away by the negative outcome. A player who receives an outcome that takes away one type of equity while providing more of another type may tend to underestimate the negative impact of the lost equity while overestimating the positive impact of the equity provided. The player may therefore not feel so bad at having lost one type of equity. To provide an example, a player may be paid three credits every time his game character falls down a chute in the "Up and Down Game". Thus, the player will have lost positional equity, but will have gained credits. The player may then not be so frustrated at having been moved further back on the game board. In another example suppose a player's goal in a secondary game is to aggregate bricks so as, for example, to build a house. Suppose further that the player has a limited number of handle pulls in which to aggregate such bricks. The player may receive an outcome that provides him with three bricks, but which reduces the number of handle pulls remaining by five. Therefore, the player has gained one type of equity in the number of symbols aggregated, but has lost another type of equity in the number of pulls remaining in which to aggregate such symbols. In a third example, a game character in the "Up and Down Game" may reach a ladder. The game character may then climb that ladder, but will use up several handle pulls doing so. Thus, the player will have again lost equity in the amount of handle pulls remaining in which to reach the end of the game board. However, the player will have gained positional equity in that the ladder will advance the player's game character further up the game path.

Exemplary Embodiments

The following vignettes describe examples of player interactions and participation in various embodiments of the present invention.

Example one of an embodiment: John sat down at a dollar denomination gaming device. The device was called Billy Goat Gruff. On the belly glass, John read the instructions which said, "Buy a block of pulls, start with a balance of ten credits, and win lots more when ever you see a goat symbol across an active pay line. But beware of the troll. When a troll symbol appears on an active pay line you lose half your balance." John could also see the prices for different blocks of pulls. He decided to buy the block of twenty pulls for $10.

John inserted a ten-dollar bill into the gaming device and pressed a button labeled "20 pull block". John saw that a portion of his display labeled "pulls remaining" now showed the number twenty. His credit balance showed the number ten. John made his first five handle pulls. On each pull, he saw many symbols of happy goats, each munching on fresh green grass. He won credits on every pull, and his credit balance quickly rose to thirty. But then, on his sixth pull, a troll symbol came up. John's credit balance went from thirty down to fifteen. In the next few pulls, John built his balance back up, but then saw another troll and once again lost half of his balance. Just before pull twenty, John had managed to build his balance back up to thirty-two coins. If only he could avoid the troll on this one last pull. Nervously, John pulled the handle one last time. Three happy goat symbols! John finished with a balance of thirty-five coins. He cashed out and received $35, making a profit of $25.

Example two of an embodiment: John was happy after winning $25, but that last pull had made him nervous. He wanted to be able to quit when he was ahead, and not have to make more pulls that could bring up the troll. So John found another Billy Goat Gruff machine that did not require him to buy a block of pulls. John only had to keep a minimum of a twenty-credit balance in the machine. John would have to wager one credit to initiate a handle pull. Additionally, any troll that came up would take away ten credits from John's balance. John began by inserting a $50 bill, giving him fifty credits. John then began play. Soon, he was up to sixty-five credits. He sensed that a troll was about to come up. So he cashed out right away, and kept his $15 profit.

Example three of an embodiment: Susan sat down at a quarter-denomination gaming device. The gaming device was called "Cops and Robbers". It had two display screens. The lower screen displayed three video reels. The upper screen displayed an aerial map of a small town. The map had several buildings clearly marked. Some buildings were banks, one was a sheriffs station, one was a jail, and one was a hideout. Since she had never played "Cops and Robbers"

before, she touched an area of the lower screen labeled, "How to Play." The following description appeared:

"To play this game, you must purchase a block of 40 pulls by inserting $10. Each pull will spin the reels and generate symbols that will allow you to win payouts. Winning combinations are shown on the pay table displayed on the belly glass below. In addition, certain symbols will control the action in the bonus game on the top screen. In the bonus game, you are a robber, and your object is to rob banks. After you rob a bank, you want to deposit the stolen credits in your hideout, where it is safe. Otherwise, the cops might catch you and take away any credits in your possession. In addition, a cop can put you in jail. When you are put in jail, you will not be able to win any payouts, nor leave jail, on your next three handle pulls. The one exception is the jackpot, which you can win at any time. At the end of your forty pulls, you get to keep any money stashed in your hideout, plus any money in your possession."

Susan thought this sounded like an interesting game, so she inserted $10 into the "Cops and Robbers" gaming device. She noticed a separate LED screen labeled "pulls remaining" that now showed the number "40". Her first pull yielded the outcome "horse-tavern-gun". This outcome did not result in any payout, nor did it result in any action in the bonus game. Her "pulls remaining" now read "39". Susan's next pull resulted in the outcome "whisky-bank-stage coach". Since she had obtained a "bank" symbol, action now ensued in the bonus game. She watched an animated robber dash around the streets of the town before disappearing into one of the banks. Frantic people were then seen streaming out of the bank. Later, the robber appeared again, this time carrying a bag. The bag was labeled "10". So the robber had stolen ten credits! Susan was excited. The robber remained still with his bag in front of the bank, as Susan proceeded with her next handle pull. Her next outcome was "stage coach-stage coach-stage coach". Five quarters immediately dropped into her tray, though there was no action in the bonus game.

Susan's next outcome was "hideout-rope-clock tower". Again, action in the bonus game ensued. The robber scurried around down before finally stopping in front of the hideout building. The robber disappeared inside. When he came out, his bag was labeled "0", but now the hideout building was labeled "10". So the robber had deposited the ten credits stolen from the bank into his hideout. Susan was happy because now those ten credits could not be taken away by a cop. A few handle pulls later, Susan achieved another bank symbol, and this time netted twenty credits from the bank. However, three pulls after that, she got the outcome "horse-well-badge". The "badge" symbol represented a cop. Soon the bonus screen came alive with an animated cop chasing the robber all over town. Eventually, the robber managed to get away but dropped the bag with the twenty credits in the process. "Too bad," Susan thought. She would not be receiving those twenty credits.

Several pulls later, Susan obtained another bank symbol, and this time netted fifteen coins. When she had only twelve pulls left, the robber was still in possession of the fifteen credits. Then, Susan obtained the outcome "cow-tavern-jail". The "jail" symbol looked like the bars of a jail cell. Once again, the robber was chased all over town by a cop. The cop caught up to the robber. This time, the cop dragged the robber over to the town jail. The robber could then be seen overlaid on the jail building. Fortunately, the fifteen credits had not been taken from the robber. Susan noticed another LED screen labeled "pulls in jail". The LED screen read "3". Susan's next pull was "well-well-well". The pull would have won her ten credits, but unfortunately the robber was stuck in jail. Her "pulls in jail" display now read "2". Susan's third pull since the robber entered jail was also disappointing. She got a bank symbol, but to no avail, since the robber was still stuck in jail. However, after Susan made this third pull, her robber was seen walking out of jail and stretching his arms. He was now free.

In her next few pulls, Susan obtained a few more bank symbols. The robber's bag had swollen to fifty credits. Susan had only two pulls remaining of her original forty pulls. If only she could deposit the money in her hideout, or at least avoid another cop! With much apprehension, Susan made her second to last pull. The outcome paid nothing, but also did not bring the dreaded cop! Susan made her final pull. Once again, no cop! Susan was quite relieved. The gaming device now paid out sixty-five credits: ten credits from the hideout, and fifty credits from the robber's bag. Susan had received a total of seventy credits, after having paid forty to play. Her profit was thirty credits, or $7.50.

Example Four of an Embodiment

Henry sat down at a gaming device labeled "Treasure Hunter". The gaming device had an upper display screen and a lower display screen. The upper display screen showed a map of several islands, including several islands each containing a treasure chest, a "Pirate Island", and a "Safe Harbor" island. The upper display screen also showed a depiction of a ship belonging to the player. The player's ship would sail among the islands, gathering treasure and attempting to deposit the treasure at the "Safe Harbor" island. The player's ship would attempt to avoid pirate ships, which would steal any treasure contained aboard the player's ship. The player's ship would also attempt to avoid any hurricanes, which would also take away the player's treasure by sinking the player's ship. The lower display screen contained depictions of three slot machine reels, replete with treasure-themed symbols.

The object was to spin the reels on the lower screen until a "Treasure" symbol appeared. The player's ship would then sail to an island containing treasure and would pick up a treasure chest. Having obtained the treasure, the object was now to spin the reels again in order to bring the treasure to the "Safe Harbor" island. The player could get the treasure to the "Safe Harbor" island by obtaining a "Safe Harbor" symbol on the reels displayed on the lower display screen. Then, on the upper display screen, the player's ship would be shown sailing to the "Safe Harbor" island. Once the treasure was brought to the "Safe Harbor" island, the player would be guaranteed a certain payout corresponding to the acquired treasure. However, before getting to the safe harbor, the player risked obtaining a "Pirate Attack" symbol. If the player obtained a "Pirate Attack" symbol, then a pirate ship would be shown attacking the player's ship, and the player would lose any treasure on board. If the player obtained a "Hurricane" symbol, then the player's ship would be shown being sunk by a hurricane. The player would again lose any treasure on board. The player would, however, get a new ship.

For an initial payment of twenty credits, a player would be allowed to keep making handle pulls without further payment. Each handle pull would be part of the same game. The game would finally end when the player has treasure taken from him for the third time. At the end of the game, the player would be allowed to keep all the credits corresponding to the treasure he had deposited in the "Safe Harbor" island. Prior to starting the game, the player would also be given the option to pay forty credits, or some other multiple of twenty credits. The value of any treasure obtained by the player would then be increased proportionally.

Henry inserted sixty credits. He then pressed a button labeled “Begin Play: 60”, indicating that he wished to play a game in which the initial payment was sixty credits. On his first spin, he obtained the symbols “Dry Land—Dry Land—Dry Land”. There was no effect, even though three like symbols were lined up. Henry would only be paid by obtaining a “Treasure” symbol followed by a “Safe Harbor” symbol. On his second spin, Henry obtained the outcome “Dry Land—Treasure—Dry Land”. The upper display screen then showed Henry’s ship sailing to an island with treasure on it. When the ship reached the island, the upper display screen showed a message. “Ahoy mate! You discovered treasure! Now get it to Safe Harbor!” Additionally, the upper display screen showed a close-up depiction of the island reached by Henry’s ship. A treasure chest was shown sitting on the island with an “18 credits” label in close proximity. Henry then made another spin. The outcome was now “Dry Land—Anchor—Sail”. The outcome had no effect on the game. The upper display screen once again showed the original depiction of the map of the multiple islands. Henry made another handle pull. The outcome was now “Safe Harbor—Anchor—Dry Land”. The upper display screen then showed Henry’s ship sailing to an island labeled “Safe Harbor”. Henry had now deposited a treasure worth 18 credits at the “Safe Harbor” island. He was now guaranteed at least 18 credits at the end of the game. However, Henry would not be paid until the end of the game.

Henry’s next spin brought another “Treasure” symbol. Once again, his ship sailed to an island with treasure on ft. Henry’s following outcome was “Dry Land—Hurricane—Sail”. The top screen then showed an animation of a storm cloud blowing at the player’s ship. The screen displayed the message, “Hurricane, ship sunk! Sorry, treasure on ship is lost” Although Henry had lost his treasure and his ship, he was granted a new ship.

Henry later achieved another “Treasure” symbol. He was again able to deposit the treasure, now worth twenty-four credits, at the “Safe Harbor” island. Henry then obtained still another “Treasure” symbol, this one worth fifteen credits. However, soon thereafter, Henry obtained the outcome “Sail—Pirate Attack—Sail”. The upper display screen now showed a depiction of a pirate boarding the player’s ship. The following message was displayed on the upper display screen, “Pirate Attack! Treasure Stolen!”

Henry had now had treasure taken from him twice. He had one more chance to acquire more treasure and to bring it to Safe Harbor. Unfortunately, the next time Henry acquired treasure, it was taken away by another “Pirate Attack” symbol. The upper display screen showed how Henry had lost treasure three times. The message “3 treasures lost” was displayed. Underneath the message were displayed, “hurricane sunk ship”, “pirate stole treasure”, and “pirate stole treasure”. Additionally, the screen displayed, “Game Over. Do you want to play again?” Finally, a large depiction of the “Safe Harbor” island was displayed on the upper display screen. It showed the two treasure chests gathered by the player. The total of Henry’s winnings, “42 credits” was also displayed next to the treasure. The gaming device then added forty-two credits to Henry’s credit meter.

Example Five of an Embodiment (Up and Down Game)

Tim sat down at a nickel-denomination gaming device labeled “Up and Down Game”. The gaming device had two screens. On top was a bonus screen with a game board displayed. On the bottom was a screen with five reels displayed. Tim was quite familiar with the game, having played several times before. To begin play, Tim inserted a five-dollar bill He would now get twenty handle pulls without having to pay further. For each pull, five pay lines would be enabled. Each pay line would give Tim the chance to win a payout. In addition, each pull might yield symbols to control the action in the game on the bonus screen.

The game board displayed in the bonus screen consisted of a winding path, with one hundred spaces. Some of the later spaces on the path were marked with numbers, such as five, ten, fifteen, eighty, and one hundred. The last space on the path was marked with the number ten thousand. A game character started at the beginning of the path. The object of the bonus game was for the game character to finish on one of the later spaces on the path, which would result in a payout corresponding to the marking on the space. If the character reached the last space, the payout would be ten thousand credits.

Certain symbols on the reels would cause the game character to advance along the path in the bonus game. For example, a “+3” symbol would cause the game character to advance three spaces along the game path. If a given handle pull yielded several symbols related to the bonus game, then the game character would advance by a number of spaces equal to the total of the reel symbols. For example, if a handle pull yielded reel symbols of “+2”, “+1”, and “+4”, then the game character would advance by 7 spaces. The reels also had the possibility of making the game character move backwards, with such symbols as “−1” or “−3”.

An additional feature of the bonus game was that there were certain shortcuts connecting otherwise separated spaces on the game path. For example, a “ladder” shortcut connected the third space on the game path to the $20^{th}$ space. Therefore, if the game character were to land exactly on the third space, he would automatically advance to the $20^{th}$ space on the game path, thereby coming closer to reaching some of the final spaces on the game path. However, a game character might also land on a “chute”, which would cause the game character to fall from a more advanced space on the game path to a space further back. For example, a chute connected the $99^{th}$ space to the $50^{th}$ space on the game path. Therefore, a player who landed on the $99^{th}$ space would automatically fall back to the $50^{th}$ space.

Tim began play. Virtually every handle pull, he won a few coins in payouts. In addition, there was usually at least one symbol on the reels that caused the game character in the bonus game to advance. On Tim’s $6^{th}$ pull, his game character began on the $21^{st}$ space. He obtained the symbols “+3”, and “+2”. Tim was relieved. The “+3” symbol alone would have put his character on the $24^{th}$ space, which was the entrance to a chute. Fortunately, Tim’s character could now land on the $26^{th}$ space, which was a ladder. The character advanced to the $60^{th}$ space. By his $12^{th}$ pull, Tim was on space 85, very close to some of the spaces where he would obtain payouts. Unfortunately, Tim obtained a “+4” which put him at the entrance of a chute on space eight-nine. Tim’s character fell back to space fifty-eight. In his next few pulls, Tim’s game character advanced and even reached a ladder. On his last pull, Tim was on the $92^{nd}$ space. If he could only remain there, he would receive twenty credits. If his character could advance 8 more spaces, Tim would win ten thousand credits. Tim’s last spin gave him a “+2” and a “+2”. His character advanced four spaces to the $96^{th}$ space. Fortunately, his character had just dodged chutes on the $94^{th}$, $95^{th}$, and $97^{th}$ spaces. He achieved a payout of eighty credits for finishing on the $96^{th}$ space. His other payouts had totaled forty-five credits. Tim had therefore won one hundred twenty five credits after paying one hundred credits to play. His profits were $1.25.

Although the present invention has been described with respect to particular embodiments thereof, those skilled in the art will note that various substitutions may be made to those embodiments described herein without departing from the spirit and scope of the present invention.

The invention is claimed as follows:

1. A gaming system comprising:

at least one processor;

and at least one memory device which stores a plurality of instructions, which when executed by the at least one processor, cause the at least one processor to:

cause a display, by a display device, of a credit meter displaying an amount of credits;

for a play of a game responsive to an input from a player of a designated wager amount on the play of the game:

randomly determine a game outcome from a plurality of different game outcomes, cause a display, by the display device, of the determined game outcome, determine a game award associated with the displayed game outcome, and increment the credit meter by any determined game award having a value greater than zero;

in addition to the credit meter, maintain an amount of equity for the player, said amount of maintained equity being distinct from said credit meter and said equity being maintained by:

accumulating an amount of equity for the player based on the designated wager amount, wherein different designated wager amounts cause an accumulation of different amounts of equity, and at periodic time intervals, reducing an amount of any accumulated equity for the player; and responsive to a triggering event occuring:

determine whether at least a designated amount of equity is maintained for the player, responsive to the determination being that at least the designated amount of equity is maintained for the player, cause a display, by the display device, of an award associated with the occurrence of the triggering event, said displayed award being based, at least in part, on the amount of equity maintained for the player, and responsive to the determination being that at least the designated amount of equity is not maintained for the player, not determine, in association with the occurrence of the triggering event, any award based on any amount of equity maintained for the player.

2. The gaming system of claim 1, wherein the periodic time intervals are designated predetermined time intervals.

3. The gaming system of claim 1, wherein when executed by the at least one processor, the plurality of instructions cause the at least one processor to cause a display, by the display device, of an amount of time remaining until the equity balance is reduced to the designated equity balance.

4. The gaming system of claim 1, wherein a first award is displayed responsive to a first amount of equity being maintained for the player when the triggering event occurs and a second, different award is displayed responsive to a second, different amount of equity being maintained for the player when the triggering event occurs.

5. The gaming system of claim 1, wherein a first time interval is associated with a reduction of a first amount of any accumulated equity for the player and a second, different time interval is associated with a reduction of a second, different amount of any accumulated equity for the player.

6. The gaming system of claim 1, wherein the display device comprises part of a mobile device.

7. The gaming system of claim 6, wherein when executed by the at least one processor, the plurality of instructions cause the at least one processor to communicate with the mobile device via a wireless network.

8. A gaming system comprising:

at least one processor;

and at least one memory device which stores a plurality of instructions, which when executed by the at least one processor, cause the at least one processor to:

cause a display, by a display device, of a credit meter displaying an amount of credits;

for each play of a plurality of plays of a game:

receive a designation from a player to place one of a plurality of different wager amounts on said play of the game;

randomly determine a game outcome from a plurality of different game outcomes, cause a display, by the display device, of the determined game outcome, determine a game award associated with the displayed game outcome, and increment the credit meter by any determined game award having a value greater than zero;

in addition to the credit meter, maintain an amount of equity for the player, said amount of maintained equity being distinct from said credit meter and said equity being maintained by:

accumulating an amount of equity for the player based on each of the wager amounts placed on each of the plurality of plays of the game, wherein different wager amounts placed cause an accumulation of different amounts of equity, and at periodic time intervals, reducing an amount of any accumulated equity for the player; and responsive to a triggering event occurring:

determine whether at least a designated amount of equity is maintained for the player, responsive to the determination being that at least the designated amount of equity is maintained for the player, cause a display, by the display device, of an award associated with the occurrence of the triggering event, said displayed award being based, at least in part, on the amount of equity maintained for the player, and responsive to the determination being that at least the designated amount of equity is not maintained for the player, not determine, in association with the occurrence of the triggering event, any award based on any amount of equity maintained for the player.

9. The gaming system of claim 8, wherein the periodic time intervals are designated predetermined time intervals.

10. The gaming system of claim 8, wherein when executed by the at least one processor, the plurality of instructions cause the at least one processor to cause a display, by the display device, of an amount of time remaining until the equity balance is reduced to the designated equity balance.

11. The gaming system of claim 8, wherein a first award is displayed responsive to a first amount of equity being maintained for the player when the triggering event occurs and a second, different award is displayed responsive to a second, different amount of equity being maintained for the player when the triggering event occurs.

12. The gaming system of claim 8, wherein a first time interval is associated with a reduction of a first amount of any accumulated equity for the player and a second, different time interval is associated with a reduction of a second, different amount of any accumulated equity for the player.

13. The gaming system of claim 8, wherein the display device comprises part of a mobile device.

14. The gaming system of claim 13, wherein when executed by the at least one processor, the plurality of instructions cause the at least one processor to communicate with the mobile device via a wireless network.

15. A gaming system comprising:

at least one processor;

and at least one memory device which stores a plurality of instructions, which when executed by the at least one processor, cause the at least one processor to:

(a) receive a designation from a player to place one of a plurality of different wager amounts on a play of a game;

(b) separate from any occurrence of any triggering event, increase an equity balance based on the placed wager amount;

(c) at periodic time intervals, decrease the equity balance; and (d) when a triggering event occurs:

determine whether the equity balance is at least a designated equity balance, (ii) responsive to the determination being that the equity balance is at least the designated equity balance:

(A) determine an award associated with the occurrence of the triggering event, wherein said determination is based, at least in part, on the equity balance when the triggering event occurs, and (B) cause a display, by a display device, of the determined award associated with the occurrence of the triggering event, and (iii) responsive to the determination being that the equity balance is not at least the designated equity balance, not determine, in association with the occurrence of the triggering event, any award based on any equity balance.

16. The gaming system of claim 15, wherein when executed by the at least one processor, the plurality of instructions cause the at least one processor to repeat (a) to (b) at least once.

17. The gaming system of claim 15, wherein the periodic time intervals are designated predetermined time intervals.

18. The gaming system of claim 15, wherein when executed by the at least one processor, the plurality of instructions cause the at least one processor to cause a display, by the display device, of an amount of time remaining until the equity balance is reduced to the designated equity balance.

19. The gaming system of claim 15, wherein a first award is determined responsive to the equity balance being a first equity balance when the triggering event occurs and a second, different award is determined responsive to the equity balance being a second, different equity when the triggering event occurs.

20. The gaming system of claim 15, wherein a first time interval is associated with a first decrease of the equity balance and a second, different time interval is associated with a second, different decrease of the equity balance.

21. The gaming system of claim 15, wherein the display device comprises part of a mobile device.

22. The gaming system of claim 21, wherein when executed by the at least one processor, the plurality of instructions cause the at least one processor to communicate with the mobile device via a wireless network.

23. A gaming system comprising:

at least one processor;

and at least one memory device which stores a plurality of instructions, which when executed by the at least one processor, cause the at least one processor to:

receive a designation from a player to place a wager on a play of a game;

for the wager placed on the play of the game, increase an equity balance, said equity balance being distinct from a credit meter;

for the play of the game:

randomly determine a game outcome from a plurality of different game outcomes, cause a display, by a display device, of the determined game outcome, determine a game award associated with the displayed game outcome, and increment the credit meter by any determined game award having a value greater than zero;

at periodic time intervals, reduce the equity balance;

responsive to a triggering event occurring at a first point in time when the equity balance is associated with a first amount of equity, cause a display, by the display device, of a first award associated with the occurrence of the triggering event at the first point in time, said first award determined based, at least in part, on the first amount of equity; and responsive to the triggering event occurring at a second, different point in time when the equity balance is associated with a second, different amount of equity, cause a display, by the display device, of a second award associated with the occurrence of the triggering event at the second point in time, said second award determined based, at least in part, on the second amount of equity.

24. The gaming system of claim 23, wherein when executed by the at least one processor, the plurality of instructions cause the at least one processor to cause a display, by the display device, of an amount of time remaining until the equity balance is reduced to a designated equity balance.

25. The gaming system of claim 24, wherein when executed by the at least one processor, the plurality of instructions cause the at least one processor to cause a display, by the display device, of the amount of time remaining by displaying a quantity of available plays of the game.

26. The gaming system of claim 23, wherein responsive to the wager being a first amount, the equity balance increases by a first amount and responsive to the wager being a second, different amount, the equity balance increases by a second, different amount.

27. The gaming system of claim 23, wherein a first time interval is associated with a first decrease of the equity balance and a second, different time interval is associated with a second, different decrease of the equity balance.

28. The gaming system of claim 23, wherein the display device comprises part of a mobile device.

29. The gaming system of claim 28, wherein when executed by the at least one processor, the plurality of instructions cause the other at least one processor to communicate with the mobile device via a wireless network.

* * * * *